US011564408B2

(12) United States Patent
Shapira et al.

(10) Patent No.: US 11,564,408 B2
(45) Date of Patent: Jan. 31, 2023

(54) LOW SUGAR FOOD PRODUCTS WITH HIGH FIBER CONTENT

(71) Applicant: YISSUM RESEARCH DEVELOPMENT COMPANY OF THE HEBREW UNIVERSITY OF JERUSALEM LTD., Jerusalem (IL)

(72) Inventors: Roni Shapira, Rehovot (IL); Eran Balachinsky, Kibutz Harel (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 125 days.

(21) Appl. No.: 16/343,840

(22) PCT Filed: Oct. 25, 2017

(86) PCT No.: PCT/IL2017/051167
§ 371 (c)(1),
(2) Date: Apr. 22, 2019

(87) PCT Pub. No.: WO2018/078623
PCT Pub. Date: May 3, 2018

(65) Prior Publication Data
US 2019/0239541 A1 Aug. 8, 2019

Related U.S. Application Data

(60) Provisional application No. 62/490,611, filed on Apr. 27, 2017, provisional application No. 62/412,855, filed on Oct. 26, 2016.

(51) Int. Cl.
A23L 2/84 (2006.01)
C12G 3/025 (2019.01)
C12H 3/04 (2019.01)
C12G 3/023 (2019.01)
C12G 3/024 (2019.01)
C12H 3/00 (2019.01)
A23L 2/02 (2006.01)

(52) U.S. Cl.
CPC .......... A23L 2/84 (2013.01); A23L 2/02 (2013.01); C12G 3/023 (2019.02); C12G 3/024 (2019.02); C12G 3/025 (2013.01); C12H 3/00 (2019.02); C12H 3/04 (2019.02); A23V 2002/00 (2013.01)

(58) Field of Classification Search
CPC .... C12H 3/00; C12H 3/04; A23L 2/02; A23L 2/84; C12G 3/024; C12G 3/023; C12G 3/025
See application file for complete search history.

(56) References Cited

U.S. PATENT DOCUMENTS

| 4,579,739 | A | 4/1986 | Darbyshire |
| 4,659,662 | A * | 4/1987 | Hsu ............ C12P 7/06 435/161 |
| 4,971,813 | A | 11/1990 | Strobel |
| 6,042,823 | A | 3/2000 | Kimura et al. |
| 9,375,027 | B2 | 6/2016 | Katzir |
| 2004/0234658 | A1 | 11/2004 | Bonnet |
| 2008/0044531 | A1 | 2/2008 | Blase |
| 2010/0040728 | A1* | 2/2010 | Henderson ...... C12P 19/18 426/599 |
| 2011/0293782 | A1 | 12/2011 | Katzir |
| 2013/0216652 | A1 | 8/2013 | Sans-Valero |
| 2015/0030749 | A1 | 1/2015 | Kosugi et al. |
| 2018/0110255 | A1 | 4/2018 | Chu |

FOREIGN PATENT DOCUMENTS

| CA | 2985875 A1 | 8/2016 |
| CH | 632137 A5 | 9/1982 |
| CN | 1409756 A | 4/2003 |
| CN | 103190665 B | 7/2014 |
| CN | 105274044 A | 1/2016 |
| CN | 105341589 A | 2/2016 |
| CN | 105838703 A | 8/2016 |
| EP | 0440975 A2 | 8/1991 |
| EP | 0458358 A1 | 11/1991 |
| EP | 0554488 A1 | 8/1993 |
| EP | 1233057 A1 | 8/2002 |
| JP | S6091970 A | 5/1985 |
| JP | H08173109 A | 7/1996 |
| JP | 5671652 B2 | 2/2015 |
| KR | 20000062118 A | 10/2000 |
| WO | 9203533 A1 | 3/1992 |
| WO | 2005051102 A1 | 6/2005 |
| WO | 2007061918 A2 | 5/2007 |
| WO | 2008102336 A2 | 8/2008 |

(Continued)

OTHER PUBLICATIONS

CN 103190665 machine translation (Year: 2013).*
CN-103190665-A Abstract (Year: 2013).*
Queenan et al., (2007) Concentrated oat beta-glucan, a fermentable fiber, lowers serum cholesterol in hypercholesterolemic adults in a randomized controlled trial. Nutr J 6: 6; 8 pages.
Baek et al., (2010) Metabolite profiling of Cheonggukjang, a fermented soybean paste, inoculated with various Bacillus strains during fermentation. Biosci Biotechnol Biochem 74(9): 100269-1-9. 9 pages.
Bekers et al., (2002) Fructooligosaccharide and levan producing activity of Zymomonas mobilis extracellular levansucrase. Process Biochemistry 38(5): 701-706.

(Continued)

Primary Examiner — Vera Stulii
(74) Attorney, Agent, or Firm — Raphael Bellum PLLC

(57) ABSTRACT

The present invention provides processes for producing food products, particularly juice beverages, with reduced sugar content enriched with dietary fibers and the food products produced. The processed food products are low in calories while preserving the palatable test of the starting material, and contain beneficial amount of dietary fibers. The processed food product further contains sorbitol and gluconic acid.

12 Claims, 10 Drawing Sheets

(56) References Cited

FOREIGN PATENT DOCUMENTS

| WO | 2012059554 A1 | 5/2012 |
|---|---|---|
| WO | 2013061891 A1 | 5/2013 |
| WO | 2015086746 A1 | 6/2015 |
| WO | 2015123063 A1 | 8/2015 |
| WO | 2016131432 A1 | 8/2016 |

OTHER PUBLICATIONS

Borsari et al., (2010) Evaluation of supplementation of sucrose medium on the synthesis of Zymomonas mobilis bio-products. Acta Scientiarum—Biological Sciences 32(3): 229-233.

Dahech et al., (2014) Optimization of levan production from Bacillus licheniformis using response surface methodology. BioChemistry: An Indian Journal (BCAIJ) 8(4): 115-119.

Dominguez et al., (2013) An Overview of the Recent Developments on Fructooligosaccharide Production and Applications. Food Bioprocess Technol. Published online: Nov. 14, 2013. https://doi.org/10.1007/s11947-013-1221-6. 14 pages.

Jang et al., (2001) Comparison of characteristics of levan produced by different preparations of levansucrase from Zymomonas mobilis. Biotechnology Letters 23: 339-344.

Kanno et al., (1982) Change of Saccharides in Soybeans during Manufacturing of Natto (Studies on Natto Part I). Nippon Shokuhin Kogyo Gakkaishi (Journal of Food Science and Technology) 29(2) 105-110. Abstract.

Numanoglu and Sungur (2004) β-Galactosidase from Kluyveromyces lactis cell disruption and enzyme immobilization using a cellulose-gelatin carrier system. Process Biochemistry 39: 703-709.

Nunokawa (1981) Oligosaccharides in Sake. Journal of the Japanese Society of Starch Science 28(2):109-117.

Parekh and Margaritis (1986) Continuous Hydrolysis of Fructans in Jerusalem Artichoke Extracts using Immobilized Nonviable Cells of Kluyveromyces marxianus. Journal of Food Science 51(3): 854-855.

Renuka et al., (2009) Fructooligosaccharide fortification of selected fruit juice beverages: Effect on the quality characteristics. LWT—Food Science and Technology 42(5): 1031-1033.

Jordão et al., (2001) Stabilization of the activity of β-galactosidase in permeabilized immobilized cells for hydrolysis of lactose in milk. Journal of food biochemistry 25(3): 257-266.

Matsumoto et al., (1989) Production of Galactooligosaccharides with β-Galactosidase. Journal of the Japanese Society of Starch Science 36(2): 123-130. Abstract.

Panesar et al., (2011) Hydrolysis of milk lactose in a packed bed reactor system using immobilized yeast cells. Journal of Chemical Technology & Biotechnology 86(1): 42-46.

Rodriguez-Colinas et al., (2011) Production of galacto-oligosaccharides by the β-galactosidase from Kluyveromyces lactis: comparative analysis of permeabilized cells versus soluble enzyme. Published in final edited version as: Journal of agricultural and food chemistry 59(19): 10477-10484.

Yu and O'sullivan (2014) Production of galactooligosaccharides using a hyperthermophilic β-galactosidase in permeabilized whole cells of Lactococcus lactis. Journal of dairy science 97(2): 694-703.

Yun et al., (1994) Continuous production of isomalto-oligosaccharides from maltose syrup by immobilized cells of permeabilized Aureobasidium pullulans. Biotechnology letters 16(11): 1145-1150.

\* cited by examiner

Counts vs. Acquisition time (min)

Counts vs. Acquisition time (min)

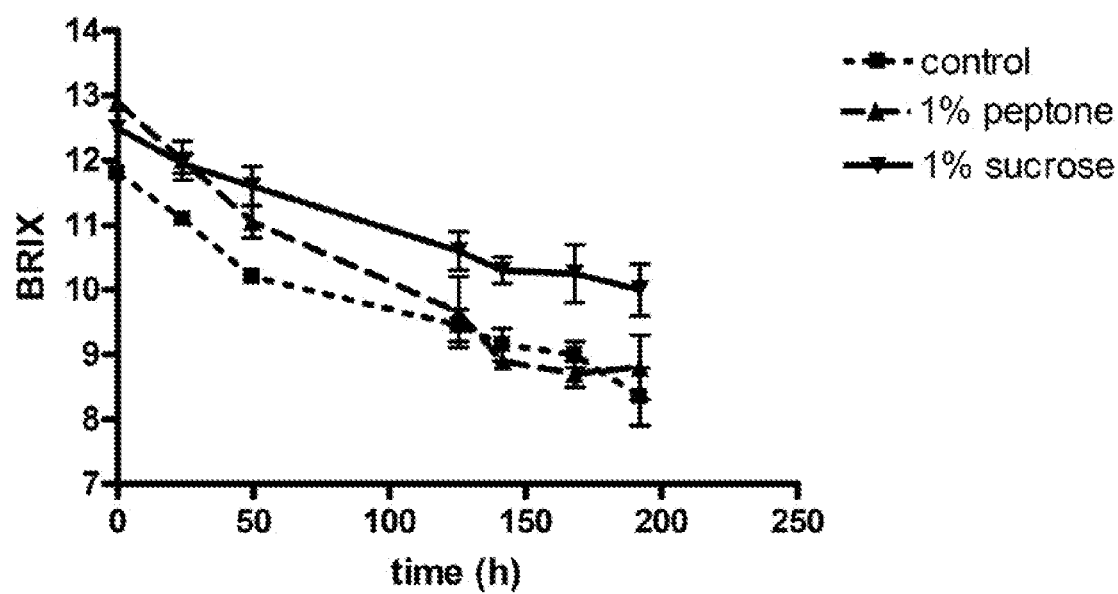

LOW SUGAR FOOD PRODUCTS WITH HIGH FIBER CONTENT

FIELD OF THE INVENTION

The present invention provides processes for producing food products, particularly juice beverages with reduced sugar content enriched with dietary fibers and the food products produced. The food products are low in calories while preserving the palatable test of the starting material, and contain beneficial amount of dietary fibers.

BACKGROUND OF THE INVENTION

Increased dietary energy intake from beverages is a major factor contributing to the obesity epidemic observed in North America during the last decades. Today, Americans consume 150-300 more calories per day than they did 30 years ago, and caloric beverages account for 50% of this increase. Energy intake from beverages currently represents 21% of total daily energy intake in the general American population. Evidence from short-term human studies suggests that calories consumed in liquid form have weak satiety properties and elicit poor energy compensation compared with calories from solid foods. These findings suggest that an increase in consumption of liquid calories may result in weight gain, and, conversely, that a reduction in liquid calorie intake may lead to weight loss. Even with no sugar added, fruit juice contains about the same amount of sugar as in soft drinks. The main contributors to the calorie content of fruit juices are the monosaccharide glucose and fructose. In beverages defined as containing "100 percent fruit juice", the sugar originates mainly from fructose. The ingestion of glucose is known to stimulate the release of body chemicals (e.g. insulin) that regulate food intake. Fructose, on the other hand, does little to suppress appetite and it seems to be preferentially associated with the formation of new fat cells.

Microorganisms are able to reduce the calorie content of juice by two major processes: biomineralization and bioconversion.

Full conversion of the mono- and disaccharides (glucose, fructose and sucrose) to carbon dioxide and water (biomineralization by aerobic respiration) can be achieved under aerobic conditions by many organisms. Metabolism of these sugars is most efficiently achieved by yeast species. Yeasts can be categorized into several groups according to their modes of energy production, utilizing respiration or fermentation. The most known yeast species, baker's and wine yeast, *Saccharomyces cerevisiae*, easily adapt to varying growth conditions. For example, glucose can be utilized in several different pathways by *S. cerevisiae*, depending on the presence of oxygen and other carbon sources. On the other hand, yeast from the genera *Kluyveromyces, Rhodotorula* and *Cryptococcus* are obligate respires (do not ferment or grow in limited oxygen environments).

The yeast *Kluyveromyces* is not sensitive to glucose concentrations, unlike *S. cerevisiae*. At high concentrations of glucose, *Saccharomyces* utilizes sugar to ethanol even under aerobic conditions (Crabtree effect). *Kluyveromyces* is Crabtree negative and, therefore, even at high concentrations of glucose/fructose it produces biomass, $CO_2$ and water under aerobic conditions, and not ethanol. Besides *E. coli* and *Aspergillus niger* var *awamori*, *K. lactis* is one of the main organisms grown in industry in fermenters to produce chymosin on a large scale. Chymosin is used for cheese production.

Plants, fungi and some bacteria are capable of converting monosaccharide to polysaccharides. Polysaccharides like cellulose, hemicellulose, pectins, gums, mucilages, and lignin are dietary fibers. Although these fibers are unrelated chemically, they all are resistant to breakdown by the human digestive system.

The glucose polymer cellulose is produced by all plants as the main component of the cell wall. Cellulose is the structural component of the primary cell wall of green plants, many forms of algae and the oomycetes (a superfamily of fungi). Some species of bacteria are capable of synthesizing cellulose and then secrete it to form biofilms. Cellulose is a polysaccharide consisting of a linear chain of several hundred to over ten thousand $\beta(1\rightarrow 4)$ linked D-glucose units and is the most common organic compound on Earth. Cellulose has no taste and is odorless. In vascular plants cellulose is synthesized at the plasma membrane by rosette terminal complexes (RTCs). RTCs are hexameric protein structures, approximately 25 nm in diameter, that contain the cellulose synthase enzymes which synthesize the individual cellulose chains. RTCs contain at least three different cellulose synthases. Cellulose synthesis requires chain initiation followed by chain elongation, two distinctly separate processes. The synthase protein isoform (CesA) glucosyltransferase enzyme initiates cellulose polymerization using a steroid primer, sitosterol-$\beta$-glucoside, and Uridine diphosphate (UDP)-glucose. Cellulose synthase utilizes UDP-D-glucose precursors to elongate the growing cellulose chain.

Bacteria from the genera *Aerobacter, Acetobacter, Achromobacter, Agrobacterium, Alacaligenes, Azotobacter, Pseudomonas, Rhizobium* and *Sarcina* synthesize cellulose. The most extensively studied member of the *Acetobacter* species is *A. xylinum*, a species that extrudes glucan chains from pores into the growth medium. These chains aggregate into microfibrils, which bundle to form microbial cellulose ribbons. Various kinds of sugars are used as substrate. Production occurs mostly at the interface of liquid and air. *Acetobacter xylinum* is nature's most prolific cellulose-producing bacterium. A typical single cell can convert up to 108 glucose molecules into cellulose in one hour. The rate of cellulose production is immense considering that as many as a million cells can be packed into one liquid droplet and each of these "factories" can convert up to 108 glucose molecules per hour into cellulose.

Fructans are fructose polymers produced by plants, yeasts, fungi and bacteria. Fructans with a short chain length are known as fructooligosaccharides (FOS), whereas longer chain fructans are termed inulins or levans. FOS can be prepared by the transfructosylation action of the enzyme $\beta$-fructosidase on sucrose. The resulting mixture contains oligosaccharide having the general formula of Glucose-Fructose. (GFn), with n ranging from 1 to 5. FOSs are naturally produced by a large variety of microorganisms including: *Aureobasidium pullulans, Aureobasidium* sp., *Arthrobacter* sp. *Aspergillus japonicus, Aspergillus niger, Aspergillus oryzae, Aspergillus phoenicis, Aspergillus sydowii, Claviceps purpurea, Fusarium oxysporum, Penicillium frequentans, Penicillium spinulosum Phytophthom parasitica, Scopulariopsis brevicaulis,* and *Saccharomyces cerevisiae.*

Longer fructans are composed of inulins, which comprise predominantly of $\beta(2\rightarrow 1)$ glycosidic bonds, and levans, which comprise predominantly of $\beta(2\rightarrow 6)$ glycosidic bonds between adjacent fructose units. Of the FOS, levan is naturally produced by microorganisms including a number of Gram-negative species, such as *Pantoea agglomerans,*

*Erwinia amylovoam, Acetobacter suboxydans, Gluconobacter oxydans,* and *Aerobacter levanicum* as well as some Gram-positive bacteria such as *Bacillus subtilis, Paenibacillus polymyxa, Bacillus amyloliquefaciens, Streptococcus mutans, Actinomyces viscosus* and a few members of the *Corynobacteria*.

Levans form non-structural carbohydrates, which can be linked together to form super-molecules comprised of hundreds of thousands of units. *Zymomonas mobilis* and members of the *Acetobacter* are the most investigated bacteria regarding levan production. Fructans, including levans, are soluble dietary fibers that act by changing the nature of the microflora content of the gastrointestinal tract and by changing the absorbance of other nutrients and chemicals. The soluble fibers absorb water to become a gelatinous, viscous substance which is fermented by bacteria in the digestive tract. The presence of fructans fills the stomach and provides for satiety feeling, which helps control weight. It has been suggested that due to their viscosity, the soluble fibers alter the composition of the bile acid pool which result in lower cholesterol level and decrease in dietary fat absorption (Queenan K M et al. 2007. Nutr. 6:6-14). It was also suggested that they delay the absorption of glucose into the blood stream preventing significant swings in blood sugar level. Soluble dietary fibers can have the additional beneficial effect of reduced constipation and improved regularity.

Various approaches have been taken to reduce the sugar content in fruit juice, aiming at different goals. For example, U.S. Pat. No. 4,579,739 discloses process for the manufacture of a naturally carbonated beverage, comprising fermenting a must with a combination of at least one yeast and at least one *lactobacillus*, the former being selected from the group of *Saccharomyces cerevisiae* and *Kluyveromyces lactis* and the latter being selected from the group of *Lactobacillus casei* and *Lactobacillus hilgardii* selected for their symbiotic ability and capability to produce a synergistic organoleptic effect which eliminates all after-taste of yeast. The must is inoculated such that the respective numbers of yeast germs and lactobacilli germs per ml have a ratio of from 1:10 to 1:500. The must is an aqueous solution of fermentable sugar which also contains natural elements, in particular assimilable nitrogen, which are necessary for the growth and activity of the yeasts. The must may therefore be a fruit juice, a vegetable juice, an extract from the seeds, toots or leaves of plants.

U.S. Pat. No. 4,971,813 discloses a process for separating and recovering aroma and flavor volatiles from fruit or vegetable juices and for lowering the amount of sugar in juices. The process involves removing the aroma/flavor volatiles from juice by forming a microaerosol by spraying the juice at a certain temperature range and into a vacuum chamber at lower temperatures of and then treating the recovered juice fraction with yeast. The alcohol formed during this fermentation reaction is removed by distillation, preferably by the same aerosolization process as the volatiles are removed. The aroma and flavor volatiles are returned to the juice to provide a good tasting low calorie fruit juice.

Japanese Patent Application No. JP1983198117 discloses a process for obtaining a fermented drink with a low alcoholic content having improved flavor for drinking. The process comprises adding preliminarily cultivated yeast of the species *Kluyveromyces lactis* or *Kluyveromyces fragilis* to a pressed juice of fruit or vegetable, such that an alcoholic fermentation is carried out. Microbial cells are then separated to give fermentation liquor, which may be concentrated and/or dried and adjusted to give the aimed alcohol concentration, preferably of less than 1% (w/v) of ethanol.

European Patent No. EP0440975 discloses a fermentation product with reduced ethanol content produced from sugar-containing fruit juices or other sugar-containing substrates. The product is obtained by adding 0.01 to 5% by weight of yeast (calculated as dry matter) and, if required, assimilable nitrogen compounds and/or phosphorus compounds to a first portion of the substrate having a content of fermentable sugars of 5 to 30% by weight to induce fermentation and by treating the mixture with 0.1 to 2 parts by volume of air or the amount of oxygen equivalent to air per part by volume of substrate and minute, until an ethanol content of 1 to 10% by volume, in particular up to 7.5% by volume, results in the substrate; at this point a second portion of the substrate is added with continued aeration with air or with oxygen.

European Patent No. EP0554488 discloses a process for selectively reducing the sugar content of sugar-containing food products while preserving their original sensory characteristics, except for "sweetness". The original foodstuff is subjected to a controlled fermentation with a species of microorganism, the species most suitable for the particular foodstuff being selected on the basis of sensory analysis according to ISO Guideline 8587 from various species of microorganism suitable for sugar degradation. The foodstuffs obtained have reduced sugar content while equivalent characteristic in comparison to the original starting product.

U.S. Application Publication No. 2004/0234658 discloses a process for controlled reduction of the sugar content of fruit juice, in particular grape juice, comprising subjecting the original fruit juice, if desired pre-clarified, to a selective ultra-filtration substantially permeable to sugars, followed by a selective nano-filtration substantially impermeable to sugars. The resulted twice-filtered residue is then mixed with the rest of the permeate or concentrate of the ultra-filtration and, if desired, with the portion of untreated original fruit juice, wherein the ultra-filtration permeate being subjected to a treatment to eliminate or limit the phenomena of crystallization or of formation of troublesome substances in the retentate or concentrate of nano-filtration.

U.S. Patent Application Publication No. 2008/0044531 discloses a method for treating a sugar-containing (e.g., sucrose, fructose, glucose) beverage (e.g., fruit juice, vegetable juice), comprising passing a stream of a beverage into contact with a packed bed of ionic adsorbent material capable of selectively removing sugar from the beverage and separating a sugar-diminished beverage from the packed bed. A high intensity natural and/or artificial sweetener can be added to the sugar-diminished beverage to produce a beverage product having similar flavor and nutritional content as the original beverage, but containing a lower amount of calories. The sugar-reduced beverage also can be used as a flavoring for the beverage and food industry; or as an ingredient component for reduced and full calorie foods (e.g., jellies, candies, etc.). The sugar-reduced beverage can be concentrated to a higher level using less energy as compared to standard juices. The resulting concentrate also realizes significant frozen storage and shipping costs compared to standard juice concentrates.

U.S. Pat. No. 9,375,027 discloses fruit juices, purees, and other food products in which a part of the available sugars in the fruit products is converted to non-digestible polymers, thereby lowering the energetic content and simultaneously increasing the nutritional value by forming prebiotic components in the product stables in juices. Further disclosed is a method of manufacturing juices and purees, enabling to preserve all components but sugars naturally occurring in the fruit.

U.S. Application Publication No. 2013/0216652 discloses a method of reducing the intrinsic sugar content in a food product such as a juice or a ready to drink sugar based product, by contacting the food product with sufficient amounts of at least one transglycosidase under conditions sufficient to enzymatically convert intrinsic sugars in the food product to non-digestible carbohydrates and non-digestible oligosaccharides, such as fructo-oligosaccharides, and gluco-oligosaccharides to thus form a more nutritional product. The invention also relates to nutritional food products produced by the methods of the invention.

However, there is a recognized need for, and it would be highly advantageous to have a low cost process for reducing the sugar content of fruit or vegetable juice beverages while enriching the juice with dietary fibers and juice beverages so obtained.

SUMMARY OF THE INVENTION

The present invention provides a process for reducing the sugar content in food products, particularly in juice obtained from fruit or vegetables and enriching the food product with dietary fibers, sugar alcohols (natural low calorie sweeteners) and acidity regulators. The present invention further provides low-calorie high fiber food products, particularly juice beverages that are not carbonated and essentially devoid of alcohol.

The present invention is based in part on the unexpected discovery that contacting fruit juice, particularly apple juice with certain microorganism or with a particular combination of yeast and bacterium or fungus in a dead or alive form) results not only in the reduction of the sugar content of the juice (including sucrose, fructose, and glucose) but also in the conversion of the sugar mono- or disaccharide to oligosaccharide and/or polysaccharides, sugar alcohol and gluconic acid. The resulting juice is low in sugar content and calories and contains beneficial dietary oligo- and/or polysaccharide contributing to the digestion and satiety feeling of a person consuming same. The added dead or alive microorganism(s) have no negative effect on the taste of the juice which keeps its palatable characteristics but with reduced sweetness. When dead microorganism(s) are used, they are killed in a certain way which preserves the activity of enzymes within the dead microorganism(s) cell.

The process and products of the present invention are advantageous over hitherto known processes for producing low sugar-high oligo- and/or polysaccharide food products at least in that (1) intact microbial cells (dead or alive) are used, such that there is no need to use expensive isolated enzymes, nor genetically modified microorganisms or enzymes and the microbial cells are active both in reducing the amount of mono- and disaccharides present in the juice and in converting the sugars to oligo- and/or polysaccharide(s); (2) The cells, particularly dead cells can be immobilized and optionally further packed in columns or beds for easy handling; (3) reduction in sugar content results from the reduction in the content of all main saccharine glucose, fructose and sucrose typically present in sweet food products; and (4) additional beneficial products, including sorbitol and gluconic acids are produced.

According to certain aspects, the present invention provides a process for preparing a low sugar, high fiber food product comprising the step of contacting a starting food product containing sugar or a composition comprising same with at least one type of microbial cells active in reducing the sugar content of the starting food product and in converting mono- or disaccharides to at least one oligosaccharide and/or polysaccharide, thereby obtaining a processed food product with reduced sugar content and elevated content of at least one oligosaccharide and/or polysaccharide compared to the starting food product.

According to certain embodiments, the microbial cells are selected from the group consisting of dead cell, living cells and a combination thereof. According to certain exemplary embodiments, the microbial cells are dead cells.

Any method as is known in the art to obtain non-proliferating, non viable dead microbial cells which preserve the activity of converting mono- or disaccharide to oligo- and/or polysaccharide can be used according to the teachings of the present invention.

According to certain exemplary embodiments, the dead microbial cells are obtained by exposure of living cells to from about 50% to about 90% ethanol.

According to additional certain exemplary embodiments, the microbial cells are obtained by exposure of living cells to 50%-90% ethanol for about 30 min.

It is to be explicitly understood that, when applicable, the dead microbial cells keep the integrity and/or functionality of the cell wall. The presence of cell wall may assist in using the dead microbial cell in a suspended form as well as in an immobilized form according to certain embodiments of the invention. According to certain embodiments, the cell membrane (also called plasma membrane or plasmalema) is at least partially disrupted.

According to certain embodiments, the dead microbial cells are immobilized in or on a matrix.

According to certain embodiments, the starting food product or the composition comprising same has a pH below 7.0. According to some embodiments, the pH of the starting food material or the composition comprising same is from about 2.5 to about 6.5.

According to certain embodiments, the starting food product is a liquid.

According to certain embodiments, the starting food product is a natural juice or a ready-to-drink product containing sugar. According to certain embodiments, the pH of the natural juice or the ready-to-drink product is from about 2.5 to about 4.5.

According to certain embodiments, the obtained processed food product further comprises at least one sugar alcohol. According to certain exemplary embodiments, the sugar alcohol is sorbitol. According to certain embodiments, the obtained processed food product further comprises gluconic acid. According to certain exemplary embodiments, the obtained processed food product further comprises sorbitol and gluconic acid.

According to certain embodiments, the obtained processed food product comprises reduced fructose, sucrose and glucose content compared to their content in the starting food product containing sugar.

According to certain embodiments, the processed food product obtained by the process of the invention has equivalent taste and aroma to those of the starting food product with reduced sweetness.

According to certain embodiments, the conversion of mono- or disaccharides (glucose/fructose/sucrose) to oligo- and/or polysaccharides is not associated with the production of deleterious byproducts not suitable for human consumption.

According to certain exemplary embodiments, the produced oligo- or polysaccharide is a polymer of fructose.

According to some embodiments, the polymer of fructose is fructan, including short chain length oligosaccharides (fructooligosaccharide, FOS) and long chain length fructan polysaccharides. According to some exemplary embodiments, the fructan polysaccharide is levan.

According to certain exemplary embodiments, the food product obtained by the process of the invention comprises polysaccharide(s) at a concentration of from about 1 mg to about 15 gr per 100 ml juice (0.001% to 15% w/v).

The dead or alive microbial cells and the starting food product are contacted for a sufficient time and under suitable conditions as to reduce the sugar content of the starting food product and convert the mono- or disaccharides, particularly fructose, glucose and sucrose to polysaccharide(s). The exact incubation time and conditions would depend on the type of the starting food product and the type of microbial cells used.

According to certain embodiments, when the starting food product is natural juice, the natural juice can be a clear juice, a juice suspension and even a puree.

According to certain embodiments, contacting the microbial cells with the starting food product or a composition comprising same comprises adding the dead or living microbial cells to the starting food product or to the composition comprising same.

According to these embodiments, the method optionally further comprises separating the microbial cells from the processed food product or the composition after the required incubation time.

According to certain exemplary embodiments, the microbial cells are dead and the dead microbial cells are immobilized onto or within a matrix.

According to some embodiments, contacting the microbial cells with the starting food product or a composition comprising same comprises adding the matrix containing the immobilized dead microbial cells to the starting food product or to the composition comprising same. According to these embodiments, the method further comprises separating the matrix from the food product or the composition after the required incubation time. According to some embodiments, the matrix is in the form of beads.

According to certain exemplary embodiments, the matrix is packed in a bed or in a column. According to these embodiments, contacting the microbial cells with the starting food product or a composition comprising same comprises passing the starting food product or a composition comprising same through the column. According to certain exemplary embodiments, the starting food product or composition comprising same is passed through the column at a rate of from 0.01 to 10 column volumes per hour.

According to certain embodiments, the microbial cells are selected from the group consisting of yeast, bacteria and a combination thereof.

According to certain embodiments, the yeast is selected from the group consisting of *Xanthophyllomyces dendrorhous Kluyveromyces lactis, Ogataea polymorpha, Metschnikowia fructicola, Saccharomyces cerevisiae*, yeast isolated from olives and any combination thereof. Each possibility represents a separate embodiment of the present invention.

According to some embodiments, the yeast is *Xanthophyllomyces dendrorhous*

According to some embodiments, the yeast is of Crabtree negative species. As used herein the term "Crabtree negative" refers to the capability of the yeast to convert sugar to biomass, $CO_2$ and water under aerobic conditions, with no or negligible production of ethanol. According to these embodiments, the yeast is selected from the group consisting of *Kluyveromyces lactis, Ogataea polymorpha, Metschnikowia fructicola*, yeast isolated from olives and any combination thereof.

According to certain embodiments, the bacteria are selected from the group consisting of *Zymomonas mobilis, Acetobacter xylinum Sarcina ventriculi, Gluconobacter xylinus, Pseudomonas* sp. #142 (also called *Cupriavidus* sp. ATTC 55702), *Microbacterium laevaniformans, Paenibacillus polymyxa, Bacillus licheniformis, Bacillus subtilis* (formerly known as *Bacillus natto*), *Bacillus macerans, Streptococcus Salivarius, Leuconostoc mesenteroides Aerobacter levanicum* (also called *Herbicola*) and any combination thereof. Each possibility represents a separate embodiment of the present invention.

According to certain exemplary embodiments, the microbial cells are dead cells of the bacterium *Zymomonas mobilis*.

According to additional exemplary embodiments, the microbial cells are dead cells of the bacterium *Bacillus licheniformis*.

According to certain embodiments, the process comprises contacting the starting food product with a combination of dead or living cells of at least one yeast species and at least one bacteria or fungi species. The cells can be dead or alive. According to certain embodiments, a combination of dead cells and living cells is used.

According to certain exemplary embodiments, wherein a combination of cells of yeast and bacteria or fungi is used, the yeast is selected from the group consisting of *Xanthophyllomyces dendrorhous, Kluyveromyces lactis, Ogataea polymorpha, Metschnikowia fructicola, Saccharomyces cerevisiae* and yeast isolated from olives. Each possibility represents a separate embodiment of the present invention. According to certain exemplary embodiments, the yeast is *Kluyveromyces lactis*. According to other exemplary embodiments, the yeast is *Metschnikowia fructicola*.

According to certain exemplary embodiments, when a combination of at least one yeast species and at least one bacteria species is used, the bacteria is selected from the group consisting of *Zymomonas mobilis, Acetobacter xylinum Sarcina ventriculi, Gluconobacter xylinus, Pseudomonas* sp. #142 (also called *Cupriavidus* sp. ATTC 55702) *Microbacterium laevaniformans, Paenibacillus polymyxa, Bacillus licheniformis, Bacillus subtilis* (formerly known as *Bacillus natto*), *Bacillus macerans, Streptococcus Salivarius, Leuconostoc mesenteroides* and *Aerobacter levanicum* (also called *Herbicola*). Each possibility represents a separate embodiment of the present invention.

According to certain additional exemplary embodiments, when a combination of dead or alive yeast cells and dead or living bacteria cells are used, the bacterial cells are of the bacterium *Zymomonas mobilis*. According to further exemplary embodiments, the bacterial cells are of *Bacillus licheniformis*.

According to other exemplary embodiments, when the dead or alive cells are of a fungus or a combination of yeast and fungus, the fungus is selected from the group consisting of *Aureobasidium pullulans, Aspergillus japonicus, Aspergillus niger, Aspergillus foetidus Aspergillus oryza, Sclerotinia sclerotiorum* and *Scopulariopsis brevicaulis*. Each possibility represents a separate embodiment of the present invention. According to certain embodiments, the dead or living microbial cells are of the fungus *Aspergillus japonicus*.

According to certain embodiments, a combination of dead yeast cells and dead bacteria or fungi cells is used. According to other embodiments, a combination of living yeast cells and living bacteria or fungi cells is used.

According to certain embodiments, contacting the starting food product with the dead or living microbial cells comprises suspending the microbial cells in the starting food product or a composition comprising same, wherein the process further comprises separating the microbial cells from the processed food or the composition comprising same. According to certain currently exemplary embodiments, wherein the microbial cells are dead cells, contacting the starting food product with the dead microbial cells comprises passing a stream of the starting food product or a composition comprising same into contact with immobilized dead microbial cells, wherein the process further comprises collecting the processed food product or the composition comprising same.

The conditions under which the dead or living microbial cells are contacted with the starting food product, including, inter alia, the temperature, pH, oxygen concentration and duration depend on the microbial cell species (including yeast, bacteria and fungi), combination thereof and the type of the starting food product. Unexpectedly, the present invention now shows the conversion of fructose, glucose and sucrose to oligo- and/or polysaccharide under acidic pH conditions. Acidic pH is the typical pH of natural juices.

According to some embodiments, the process further comprises repeating the step of contacting the starting food product with the dead or alive microbial cells at least once.

According to certain embodiments, the process is performed as a batch process, semi-continuous process, continuous process or a combination thereof. Each possibility represents a separate embodiment of the present invention.

According to certain embodiments, the process further comprises ethanol removal step. Ethanol removal can be performed by any method as is known in the art.

According to certain embodiments, the ethanol content in the resulting food product is below 0.5% v/v. According to additional embodiments, the ethanol concentration is below 0.1% (v/v).

According to some embodiments, the process further comprises adding an artificial sweetener to the obtained processed food product having reduced sugar content and elevated oligo- and/or polysaccharide(s) content.

According to some embodiments, sterile conditions are kept throughout the process. According to additional or alternative embodiments, the process further comprises pasteurizing the obtained processed food product having reduced sugar content and elevated oligo- and/or polysaccharide(s) content.

According to yet additional embodiments, when the starting food product is juice or ready-to-drink liquid, the process further comprises concentrating the obtained processed beverage having reduced sugar content and elevated oligo- and/or polysaccharide(s) content, either with or without prior pasteurization.

According to yet additional aspect, the present invention provides a processed food product having a reduced sugar and calorie content and elevated content of at least one oligo- and/or polysaccharide compared to a corresponding starting, non-processed food product, wherein the oligosaccharide and/or polysaccharide is selected from the group consisting of fructan and fructooligosaccharides (FOS), further comprising at least one of sorbitol and gluconic acid.

According to certain embodiments, the processed food product having reduced sugar content, elevated polysaccharide content and comprising sorbitol and/or gluconic acid is produced by the process of the present invention.

According to certain embodiments, the processed food product has a reduced content of at least one of fructose, glucose and sucrose compared to a corresponding starting, non-processed food product. According to other embodiments, the at least one polysaccharide in the processed food product is a polymer of fructose including, but not limited to fructans and fructooligosaccharides. According to some embodiments, the fructan is levan.

According to some embodiments, the processed food product having reduced sugar content, elevated polysaccharide content and comprising sorbitol and/or gluconic acid has an equivalent taste and aroma compared to a corresponding starting, non-processed food product, with reduced sweetness.

According to additional embodiments, the processed food product having comprises less than 0.5% ethanol. According to other embodiment, the processed food product is essentially free of $CO_2$.

According to certain embodiments, the processed food product is essentially devoid of microbial cells. According to certain exemplary embodiments, the processed food product is devoid of microbial cells. According to certain embodiments, the processed food product is essentially devoid of free enzymes. According to certain exemplary embodiments, the processed food product is devoid of free enzymes.

According to certain exemplary embodiments, the starting non-processed food product is natural juice or a ready to drink product containing sugar.

According to certain additional aspects, the present invention provides a process for reducing the sugar content of a starting food product and converting mono- and disaccharides to at least one oligo- and/or polysaccharide, comprising contacting the starting food product or a composition comprising same with at least one type of dead microbial cells active in reducing the sugar content of the food product and in converting mono- or disaccharides to at least one oligosaccharide and/or polysaccharide.

The at least one type of microbial cells are as described hereinabove. According to some exemplary embodiments, the at least one type of dead microbial cells is of the bacterium *Zymomonas mobilis*.

According to some exemplary embodiments, the at least one type of dead microbial cells is of the yeast *Aureobasidium pullulans*.

According to additional exemplary embodiments, the starting food product is contacted with a combination of *Aureobasidium pullulans* and *Zymomonas mobilis*.

According to certain embodiments, the at least one type of dead cells is immobilized within beads. According to some embodiments, the beads are packed in a column. According to these embodiments, the process comprises passing the starting food product through the column as to contact said starting food product with the at least one type of microbial cells.

Other objects, features and advantages of the present invention will become clear from the following description and drawings.

BRIEF DESCRIPTION OF THE FIGURES

FIG. 3 demonstrates reduction in sugar content and production of sorbitol and gluconic acid in apple juice after incubation with dead, immobilized *Zymomonas mobilis* cells.

FIG. 4 shows the changes is the sugar content of apple juice during incubation with different microorganisms.

FIG. 7 shows the effect of different growth conditions on the changes in BRIX of apple juice incubated with *Aspergillus japonicus*. FIG. 7E: Effect of peptone or sucrose addition.

DETAILED DESCRIPTION OF THE INVENTION

Figure 1:
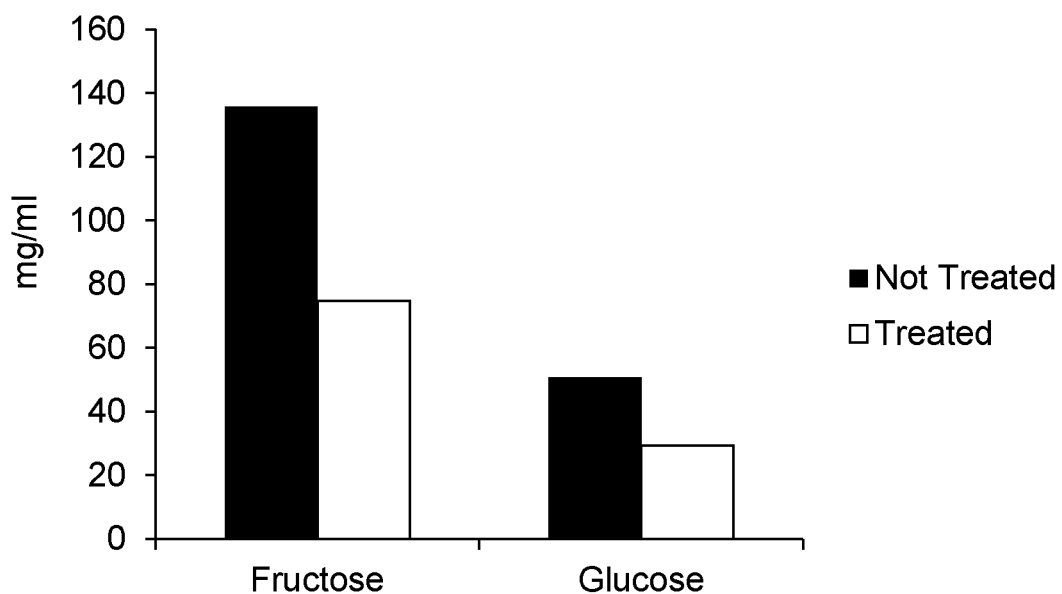
FIG. 1 shows the glucose and fructose levels in processed apple juice after passing through a column containing dead *Zymomonas mobilis* cells compared to the levels in the starting, non-treated juice.

The present invention provides a process for reducing the sugar content of food products containing sugar, particularly of natural juice beverages, and at the same time elevating the content of dietary fibers in the food product without negatively affecting other characteristics of the food product, particularly without negatively affecting the smell and the taste, only reducing its sweetness. The unique process of the invention is advantageous over hitherto known processes at least in that it is simple to operate and employs intact microbial cells, particularly dead cells that can be immobilized while preserving enzymatic capabilities, without the need to use costly and/or genetically engineered isolated enzymes. The resulted processed food product is low in calories while providing the consumer with a satiety feeling and preserves the aroma and taste of the starting, particularly natural, food product. The processed food product does not contain any significant amount of the microbial cells, nor of any enzymes. When the food product is juice, the juice obtained by the process of the present invention is not carbonated and is essentially devoid of alcohol.

The present invention now discloses contacting a food product containing sugar with a particular type or types of microbial cells, particularly dead microbial cells preserving the capability of corresponding live microbial cells of sugar reduction and conversion of mono- and disaccharides to oligo- and/or polysaccharides. In particular aspects, the present invention discloses combinations of cells (dead, alive or a combination thereof) of yeast and bacteria or fungi species that provides for this dual activity.

Definitions

The singular forms "a", "an", and "the" include plural referents unless the context clearly dictates otherwise.

Unless the context clearly requires otherwise, throughout the specification, the words "comprise", "comprising" and the like are to be construed in an inclusive sense as opposed to an exclusive or exhaustive sense; that is to say, in the sense of "including, but not limited to".

The word "about", as used in the specification, should generally be understood to refer to both numbers in a range of numerals, and refers to the numeral ±5%. Moreover, all numerical ranges herein should be understood to include each whole integer within the range.

As used herein, the term "monosaccharide" refers to a simple sugar, such as glucose or fructose that does not hydrolyze to yield other sugars.

As used herein, the term "disaccharide" refers to any compound that comprises two covalently linked monosaccharide units. The term encompasses but is not limited to such compounds as sucrose, lactose and maltose. The term "sucrose" means a disaccharide comprised of 1 mole of D-glucose and 1 mole of D-fructose wherein the C-1 carbon atom of the glucose and the C-2 carbon atom of the fructose participate in the glycoside linkage.

As used herein, the term "oligosaccharide" refers to a compound having 2 to 10 monosaccharide units joined by glycosidic linkages. The term "fructo-oligosaccharides" (FOS) means short chain oligosaccharides comprised of D-fructose and D-glucose units.

For example some FOSs comprise of one molecule of D-glucose in the terminal position and from 2 to 6 D-fructose units. The linkage between fructose residues in FOSs are a β-(2-1) glycosidic links.

The term "polysaccharide" as used herein refers to polymeric carbohydrate molecules composed of long chains of monosaccharide units bound together by glycosidic linkages and on hydrolysis give the constituent monosaccharides or oligosaccharides. They range in structure from linear to highly branch structure. According to certain embodiments, the polysaccharide of the invention is fructan. Fructans are built up of fructose residues, normally with a sucrose unit (i.e. a glucose-fructose disaccharide) at what would otherwise be the reducing terminus. The linkage position of the fructose residues determines the type of the fructan. Linkage normally occurs at one of the two primary hydroxyls (OH-1 or OH-6), and there are two basic types of simple fructan:

1-linked: in inulin, the fructosyl residues are linked by β-2,1-linkages.

6-linked: in levan (or phlein), the fructosyl residues are linked by β-2,6-linkages.

A third type of fructans, the graminan-type, contains both β-2,1-linkages and β-2,6-linkages.

The terms "dietary fibers" refers to the indigestible portion of food derived from plants. Dietary fibers include (1) soluble fiber, which dissolves in water, is readily fermented in the colon into gases and physiologically active byproducts, and can be prebiotic and viscous; it delays gastric emptying which in turn can cause an extended feeling of fullness; and (2) insoluble fiber, which does not dissolve in water, is metabolically inert and provides bulking, or it can be prebiotic and metabolically ferment in the large intestine; bulking fibers absorb water as they move through the digestive system, easing defecation. According to certain exemplary embodiments, the term "dietary fibers" is used herein to refer to soluble fibers.

As used herein, the terms "alive cells", "living cells" and "live cells" with reference to microbial cells are used herein interchangeably and refer to cells that proliferate when grown on compatible medium and are found to be viable when examined in a viability test (e.g. propidium iodide staining).

As used herein, the term "dead cells" with reference to microbial cells refers to cells that do not proliferate when grown on compatible medium and are found to be nonviable when examined in a viability test (e.g. propidium iodide staining), while keeping the capability of corresponding living cells to reduce the sugar content within a food product and to convert mono- or disaccharides to oligosaccharide and/or polysaccharide, at least to some extent.

As used herein, the terms "free enzyme" or "free enzymes" refer to enzyme or enzymes not associated with microbial cells (dead or alive) or to isolated enzyme. According to certain embodiments, the term refers to isolated enzyme(s) deliberately added to the staring food product.

As used herein, the terms "column volume/hour", "bed volume/hour" and "matrix volume/hour" are used herein interchangeably and refer to 1 unit volume of the fluent passed through to the same unit volume of the matrix/bed/column in an hour.

According to one aspects, the present invention provides a process for preparing a low sugar, high fiber food product comprising the step of contacting a starting food product containing sugar or a composition comprising same with at least one type of dead or alive microbial cells, wherein the microbial cells have a capability of reducing the sugar content of the food product and of converting mono- or disaccharides to oligosaccharide and/or polysaccharide, thereby obtaining a food product with reduced sugar content and elevated oligosaccharide and/or polysaccharide content.

According to certain exemplary embodiments, the microbial cells are dead cells.

Method for killing the microbial cells while preserving the capability of the dead microbial cells to convert mono- or disaccharide to oligo- and/or polysaccharide are known in the art. Methods commonly used in the art include incubating living cells in a solution comprising ethanol; bile salts or bile-salt like compounds (e.g. sodium cholate); synthetic detergents (e.g. Tween 20, SDS, Triton X100); aldehydes like glutaraldehyde; or formaldehyde. The solution concentration and the microbial density of the cells are determined according to the type of the solution and the microbial cells, as is known to a person skilled in the Art.

According to certain exemplary embodiments, the dead cells are obtained by isolating living microbial cells from the growing media by centrifugation and incubating the pellet with ethanol 70% at a concentration of 1 gr of cells in 1 liter of the 70% ethanol for 1 hour. According to certain embodiments, at the end of the incubation, the cells are separated from the solution and immobilized. According to some exemplary embodiments, the immobilization matrix is alginate. The matrix containing the dead microbial cells may be further sterilized by circulation of 70% ethanol within the matrix.

According to certain embodiments, the starting food product is a natural juice or a ready-to-drink product containing sugar.

Any method as is known in the art for forcing the juice out of the source material and optionally pre-treating the obtained juice before it is subjected to the process of the present invention can be used with the teachings of the present invention.

According to certain embodiments, the juice is forced out of the source material by squeezing or crushing. The terms "squeezing" and "crushing" as used herein, are intended to comprise any disintegrating procedure that provides from the edible parts of the source material a fluid, a paste, or a suspension of any density or coarseness. Said squeezing or crushing provides a natural juice from which the juice products of the invention are manufactured, wherein natural juice may have a consistency of liquid, suspended pulp, mash, slurry, or puree. According to certain exemplary embodiments, the source material is fruit.

Any fruit or vegetable juice containing sugar can be processed according to the teachings of the present invention. Thus, the process is equally applicable to apple, cranberry, pear, peach, plum, apricot, nectarine, grape, cherry, currant, raspberry, gooseberry, blackberry, blueberry, strawberry, lemon, orange, grapefruit, potato, tomato, celery, rhubarb, carrot, beet, cucumber, pineapple, custard-apple, coconut, pomegranate, kiwi, mango, papaya, banana, watermelon and cantaloupe. Each possibility represents a separate embodiment of the present invention. According to some exemplary embodiments, the juice is of apple, pear, cranberry, orange, strawberry, grape or cherry. Each possibility represents a separate embodiment of the present invention.

The process of the invention combines reduction of the sugar content of the natural juice with production of dietary fibers within the food product, particularly juice, in an efficient, cost effective way. Using microorganisms as producers of the enzymes required for such transformation of simple sugars to dietary fibers eliminates the need to isolate and purify the enzymes. Using dead microbial cells is even more advantageous as the dead cells, once produced, are not sensitive to environmental conditions, and furthermore, the enzyme activity is not subjected to rate-limiting conditions, for example substrate feedback inhibition. Unexpectedly, conversion of simple sugar to oligo- and/or polysaccharides according to the teachings of the invention occurred also at acidic pH. Hitherto, enzyme active in such conversion were shown to be active only around natural pH. According to certain exemplary embodiments, the dead microbial cells are immobilized within a matrix, typically beads. The microbial cell-containing matrix can directly be added to the natural juice or a composition comprising same such that contacting the natural juice with the microbial cells occurs during incubation. Alternatively, the microbial cell-containing matrix is packed to form a bed or a column and the natural juice contacts with the microbial cells by passing the natural juice through the bed or column.

As used herein, the terms "reducing the sugar content" or "reduced sugar content" refer to a concentration level of sugar, particularly glucose, fructose and sucrose in a food product, particularly natural juice that is less than the concentration level of sugar in a corresponding food product, which has not been contacted with the microbial cells according to the teachings of the invention.

According to certain embodiment, the total sugar content in the processed food product obtained by the process of the present invention is reduced by at least 5%, 10%, 15%, 20%, 25%, 30%, 35%, 40%, 45%, 50%, 55%, 60%, 65%, 70%, 75%, 80%, 85%, 90%, and 95% or more compared to the total sugar content in the starting food product. According to some embodiments, the fructose content in the processed food product is reduced by at least 5%, 10%, 15%, 20%, 25%, 30%, 35%, 40%, 45%, 50%, 55%, 60%, 65%, 70%, 75%, 80%, 85%, 90%, and 95% or more compared to its content in the starting food product. According to some embodiments, the sucrose content in the processed food product is reduced by at least 5%, 10%, 15%, 20%, 25%, 30%, 35%, 40%, 45%, 50%, 55%, 60%, 65%, 70%, 75%, 80%, 85%, 90%, and 95% or more compared to its content in the starting food product. According to some embodiments, the glucose content in the processed food product is reduced by at least 5%, 10%, 15%, 20%, 25%, 30%, 35%, 40%, 45%, 50%, 55%, 60%, 65%, 70%, 75%, 80%, 85%, 90%, and 95% or more compared to its content in the starting food product.

According to certain embodiments, the process of the present invention provides for a stable production of oligo- and/or polysaccharides, i.e. there is no or negligible reduction in the oligo- and/or polysaccharide content in the processed food product.

According to certain exemplary embodiments, when the processed food product obtained by the process of the invention is juice, the juice comprises oligo- and/or polysaccharide at a concentration of from 1 mg to 15 gr per 100 ml juice (0.001% to 15% w/v).

According to certain embodiments, the process comprises contacting the starting food product with a combination of dead or living cells of at least one yeast species and at least one bacteria or fungi species.

According to certain embodiments, the starting food product is simultaneously contacted with the combination of cells of at least one yeast species and at least one bacteria or fungi species. According to other embodiments, the starting food product is contacted with the cells of the at least on yeast species and with cells of the at least one bacteria or fungi species sequentially. According to certain exemplary embodiments, the starting food product is first contacted with the at least one yeast species and thereafter with the at least one bacteria or fungi species.

The resulting low calorie, high dietary fiber food product, particularly beverage, contains essentially the same nutritional benefit of the original food product, fruit or vegetable juice, but with significantly lower calories due to removal and conversion of the sugar to dietary fibers and sugar alcohol. Advantageously, the resulted processed food product may further contain gluconic acid, which is known in the food industry as an acidity regulator, thus may contribute to the stability of the resulted product. Furthermore, gluconic acid does not add any calories to the obtained food product (its calorie value is 0), and it may serves as a carrier for iron, calcium and other ions, based on its capability to form gluconate salt with such ions, which may be present in the food product. The gluconate salts provides for better bioavailability of these essential microelements.

It is however to be understood that not all the sugar must be removed/converted to obtain the low calories, high dietary fiber processed food product of the present invention.

According to certain embodiments, the food product of the present invention may have a calorie content of less than 50%, 45%, 40%, 35%, 30%, 25%, 20%, 15%, 10% or less of the food product from which it is derived. At the same time, the reduced calorie food product may have a flavor profile and mouth feel which are comparable to the starting food product.

In some food products, the reduced intrinsic sugar content may affect the taste of the product that consumers would otherwise expect. In some situations, to provide added sweetness, a natural or artificial sweetener can be added. The sweetener(s) may be selected according to the desired nutritional characteristics, taste profile, and other factors. In certain embodiments, the at sweetener is selected from the group consisting of, but not limited to, erythritol, tagatose, sorbitol, mannitol, xylitol, rhamnose, trehalose, aspartame, cyclamates, saccharin, sucralose, glycyrrhizin, malitol, lactose, Lo Han Guo ("LHG"), rebaudiosides, steviol glycosides, xylose, arabinose, isomalt, lactitol, maltitol, and any combination thereof. Each possibility represents a separate embodiment of the present invention.

When the food product of the present invention is juice beverages it can also be used as a flavoring agent or as a supplement of dietary fibers in beverages or foods. The sugar-reduced beverage can further be used as an ingredient for low calorie products (e.g., jellies, fillings, fruit preparations, candies, cakes, or the like).

The low calories high dietary fiber beverages of the present invention can optionally be concentrated by 10%-90% or more. This concentrate results in a significant reduction in volume compared to standard juice concentrates due to the reduction of sugars. Processing cost of concentrating juices is reduced significantly due to the lack of sugars in the juice streams. Sugar reduced concentrates would result in significant less frozen shipping and frozen storage cost compared to standard concentrates due to the lower volume. Thermal, flavor, and nutritional degradation of the juice is also reduced since the concentration process requires less heat and time.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Materials and Methods
Microorganism Growth Conditions

The bacteria *Zymomonas mobilis* were grown for 48 hours (or up to a concentration of $10^9$ cells/ml) in a growth medium containing 2% yeast extract and 2% glucose under anaerobic conditions at 30° C.

The yeast *Aureobasidium pullulans* were grown for 48 hours in a growth medium of 2.4% potato dextrose broth under aerobic conditions at 30° C.

The yeast *Kluyveromyces lactis, Ogataea polymorpha, Metschnikowia fructicola, Xanthophyllomyces dendrorhous* or a yeast isolated from olives; the bacteria *Gluconobacter xylinus, Pseudomonas* sp. #142, *Microbacterium laevaniformans, Paenibacillus polymyxa,* or *Bacillus licheniformis*; or the fungus *Aspergillus japonicus* were grown for 48 hours each in its specific growth medium. *X. dendrorhous* was incubated at 20'C. *K. lactis, Pseudomonas* sp. #142, yeast isolated from olives, *P. polymyxa, A. japonicus* and *G. xylinus* were incubated at 30'C; *O. polymorpha* and *M. fructicola* were grown at room temperature and *B. licheniformis* at and *M. laevaniformans* at 37'C. All cultures were rotated at 200 RPM in a 500 ml flask while *Z. mobilis* was incubated anaerobically at 30'C.

Obtaining Dead Microbial Cells

Bacteria, yeast or fungi were grown as described above. Once the culture has reached a desired cell density, cells were centrifugation and immediately suspended in 70% ethanol for 1 h. The suspension was then centrifuged to form a cell pellet. A sample of the cells from the pellet was placed on a growth medium to check the ability of the cells to grow. If no growth was observed, the cells in the pellet were designated "dead microbial cells". Optionally, viability examination using propidium iodide staining or other known viability staining procedure is performed before designating the cells as "dead cells".

Sugar Determination:

Sugars (disaccharides, monosaccharides and sugar alcohols) were separated in an analytical HPLC system (Pump System 320, Kontron, Switzerland) fitted with a Sugar-Pak I column (6.5×300 mm, Waters, Milford, Mass.) using a refractive-index detector (LDC Analytical, Riviera Beach, Fla.). Water was used as the solvent at a flow rate of 0.5 ml/min.

FOS/Levan Quantification

FOS/levan were precipitated from treated and non-treated juice samples using 1.5 volumes of iso-propanol. The sediment was air dried and either further dried at 37° C. for 48 hours and weighed or resuspended in 0.1M HCl and hydrolyzed for 1 hour at 100° C. The resulting monosaccharides were quantified by HPLC.

Acetate Analysis

Quantitative analysis of acetate ion in the sample was performed using ion chromatograph equipped with ion-conductivity detector (Dionex ICS 3000). Anions were separated on hydroxide-selective anion-exchange analytical column (AS11, 250×4 mm, Dionex).

Ethanol Analysis

The qualitative and quantitative analyses of ethanol was made using an Agilent model 5973N MSD mass spectrometer (MS) with a 7683 auto-sampler and a model 6890 gas chromatograph (GC) equipped with a 30 m×0.25 μm i.d. HP-5 (cross-linked phenylmethylsiloxane) column with 0.25 μm i.d. film thickness (Agilent, Palo Alto, Calif.). The initial oven temperature was held at 40° C. for 6 min. The temperature was then increased at a rate of 2.5° C./min to 150° C. and finally at a rate of 90° C./min to 250° C. The injection port and ionizing source were kept at 250° C. and 280° C., respectively. The split ratio is 10:1 with 2 μL of sample injected. There was a solvent delay of 2 min, after which the mass spectrum was collected from m/z 35 to 300, generating 5.27 scans/s. Compound identification was made by comparison of the mass spectra and retention times with those of a corresponding reference standard (Aldrich Chemical Co., St. Louis, Mo.; Bedoukian Research, Inc., Danbury, Conn.). For the purpose of quantifying identified component, linear regression models were determined using standard dilution techniques with cyclohexanone as internal standard. Target ions were used in the identification and quantification of each component by the mass spectrometry system.

BRIX Determination

BRIX (or Degrees Brix, symbol ° Bx) is the sugar content of an aqueous solution. One degree BRIX is 1 gram of sucrose in 100 grams of solutions. BRIX was determined using a ref-85 digital refractometer.

Immobilizing Microbial Dead Cells within and/or onto Beads

A matrix of immobilized beads and dead microbial cells was prepared as follows:

A 1,000 ml composite solution was prepared as follows:

Solution A: 10 g Na-alginate (SIGMA) in 500 ml of 100 mg/l $Na_2$-EDTA solution.

Solution B: 10 g Gelrite (SIGMA) in 500 ml of 100 mg/l $Na_2$-EDTA solution.

Solution A and Solution B were sterilized separately for 20 min at 120° C., and then mixed while still warm.

The composite solution was then cooled to room temperature, and the dead microbial cell pellet prepared as described hereinabove was re-suspended in the solution. Cell concentration was at least 4% wet weight to volume (wet w/v). Typically, the cell concentration was 6% wet w/v.

Cell Entrapment

Before the entrapment procedure, the mixture of composite solution-cells was homogenized. Debris remained in the homogenate were filtered out from the homogenate.

The mixed composite cells solution was then added drop-wise into 1% $CaCl_2$ solution pH 6.2-6.8 containing 0.005% Chitosan (high molecular weight, FLUKA). The preferred average diameter of the resulting beads should be 2 mm or less to enlarge the ratio between the surface areas of the bead to its mass. After the beads were formed, the solution was stirred for 4 hours at 25° C.; the solution containing the microbial dead cell beads was then transferred to 4° C. for 24 hours. The beads were transferred to the column using a wide opened funnel; the lower valve was open to ensure the removal of access liquid and keeping all the beads in the column. The column was washed with 10 bed volumes at the flow of 1 bed volume/hour to remove any remnant of calcium chloride.

Example 1: Changes in Sugar Content of Apple Juice Contacted with Immobilized Dead Cells of *Zymomonas mobilis*

Dead cells of *Zymomonas mobilis* were immobilized and packed in a column as described hereinabove. Commercially available apple juice was passed through the column at a rate of 0.2 bed volume (BV)/hr. Glucose and fructose levels were determined as described in the "Material and Methods" section hereinabove. FIG. 1 clearly shows a reduction in the content of both sugars in the treated juice.

Example 2: Changes in Sugar Content of Apple Juice Contacted with Immobilized Dead Cells of *Aureobasidium pullulans* Over Time Commercially available apple Juice was incubated with chitosan beads containing immobilized dead *Aureobasidium pullulans* yeast cells for 18.5 at 30° C. for 18.5 h. Samples were collected at 0, 7 and 18.5 hours. Sucrose concentration was measured by HPLC at the Agriculture Research Organization, Volcani center.

Figure 2:
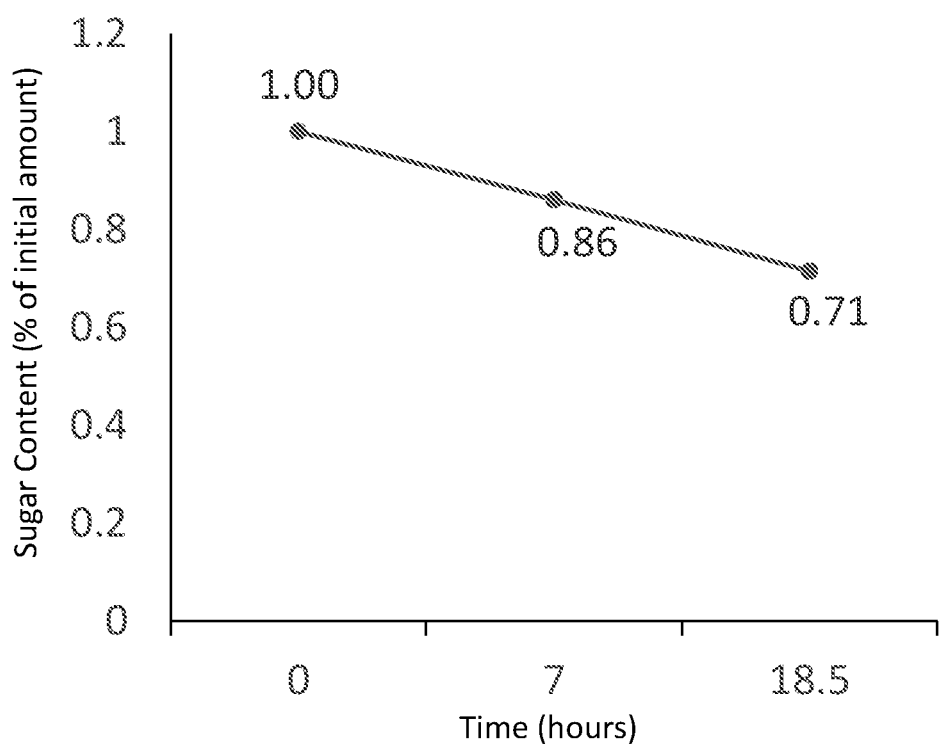
FIG. 2 demonstrates the decrease in sucrose concentration as a function of time. A decrease of 29% after 18.5 hours using the yeast *Aureobasidium pullulans* is demonstrated.

FIG. 2 shows that the sugar content in the juice is continuously reduced. After 18.5 of incubation with the immobilized yeast *Aureobasidium pullulans*, the sugar content was reduced by 29%.

Example 3: Production of Polysaccharides in Apple Juice Contacted with Immobilized Dead Cells of *Zymomonas mobilis*

FOS and/or levan production in apple juice contacted with immobilized dead *Zymomonas mobilis* cells under various temperatures was examined. The juice was passed through the column containing the immobilized dead bacteria at a rate of 0.2 BV/hr. 10 ml of the treated juice and of the source, untreated starting juice product were taken for analysis of FOS/levan as described in the "Material and Methods" section hereinabove. The results are presented in Table 1 hereinbelow.

TABLE 1 production of levan/FOS in apple juice passed through immobilized dead cells of *Z. mobilis* under different temperatures

| Temperature (° C.) | 10 | 30 | 45 | 55 |
|---|---|---|---|---|
| Levan/FOS (mg/100 ml juice) | 3 | 70 | 58 | 99 |

As is apparent from Table 1, the highest levans/FOS content was obtained when the juice was contacted with the immobilized *Z. mobilis* dead cells at a temperature of 55° C.

The possibility that higher levans/FOS levels can be obtained by re-incubating the juice obtained from a first run (at 1 BV/h) with the immobilized *Z. mobilis* dead cells for longer periods of time was examined. The juice was thus incubated with the immobilized *Z. mobilis* dead cells for 11 or 23 days. The results are presented in Table 2 herein below (day "0" denoting the juice after the first run).

TABLE 2 production of levan and/or FOS in apple juice incubated with immobilized dead cells of *Z. mobilis* as a function incubation time

| Time at 4° C. (Days) | 0 | 11 | 23 |
|---|---|---|---|
| Levan/FOS (mg/100 ml juice) | 99 | 67 | 36 |

As can be taken from table 2, there is no advantage in further incubation of the juice obtained after the first run.

Example 4: Changes in Sugar Content of Apple Juice Contacted with Immobilized Dead Cells of *Zymomonas mobilis*

Beads with immobilized dead cells of the bacterium *Zymomonas mobilis* were prepared as described hereinabove. Commercially available apple juice was incubated with the immobilized dead bacterial cells for 18.5 hours Samples were collected at 0, 7 and 18 hours. Sugar content was measured using GC-MS at the Interdepartmental unit at the Faculty of Agriculture, Food and Environment, the Hebrew University of Jerusalem.

Figure 3A:
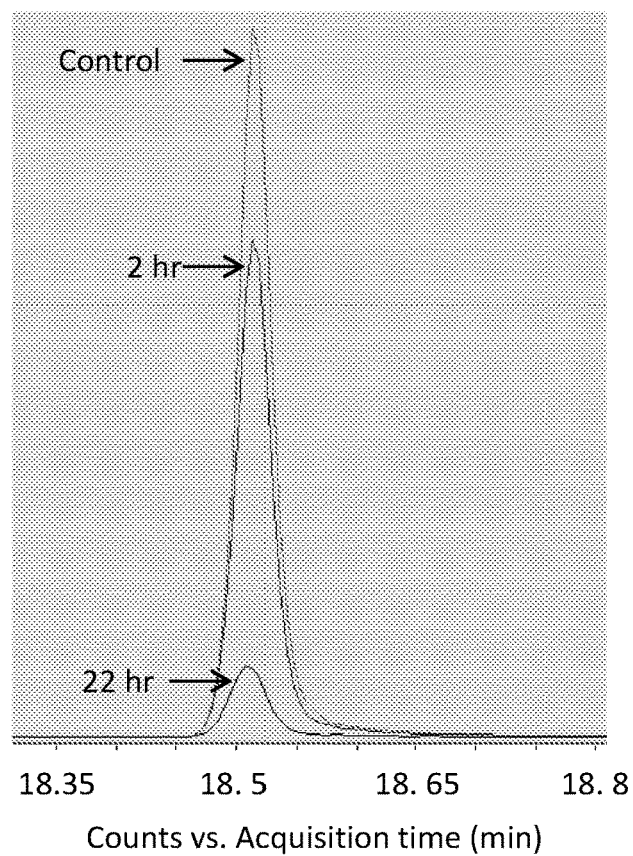
FIG. 3A: sucrose content.
Figure 3B:
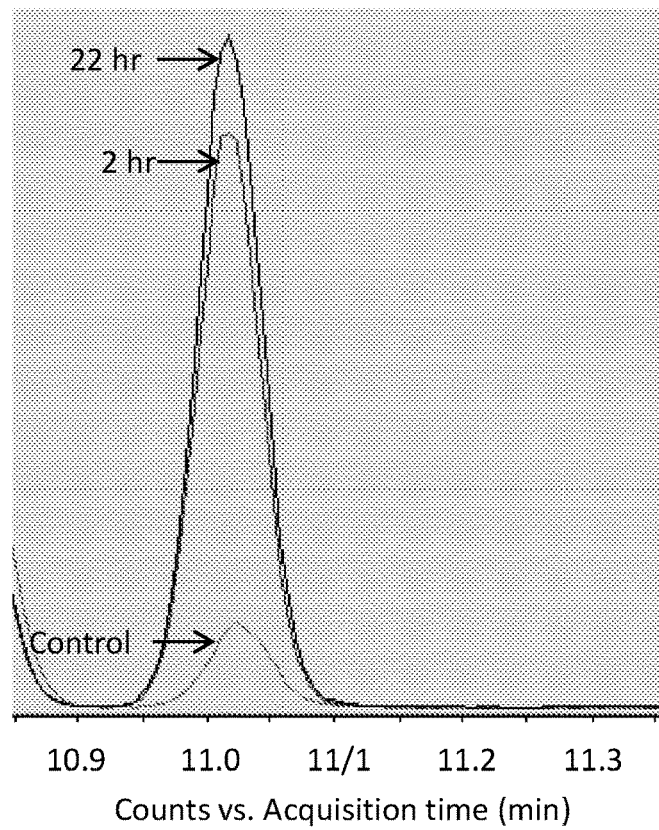
FIG. 3B: sorbitol.
Figure 3C:
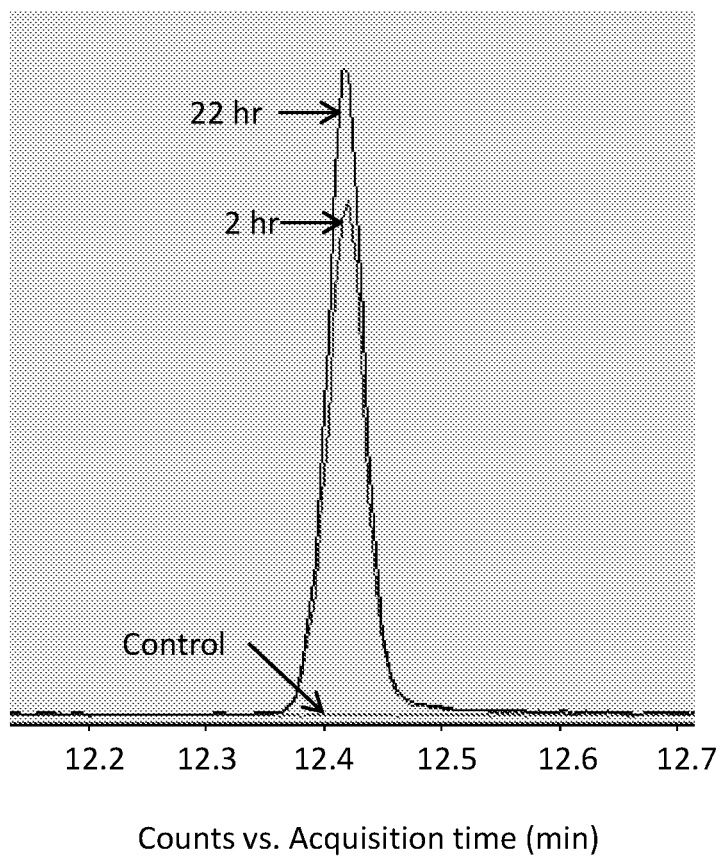
FIG. 3C: gluconic acid. Control—starting apple juice. 2 h—content after two hours of incubation. 22 h—content after 22 hours of incubation.

Sucrose content was significantly reduced as fast as after 2 hours of incubation. At the end of the experiment, the sucrose content was about 18% of its initial concentration (Table 3). Unexpectedly, under these conditions, sorbitol (FIG. 3, Table 3) and gluconic acid (FIG. 3) were produced. As is apparent from FIGS. 1 and 3, using the process of the present invention the concentration of all the main sugars of the apple juice (sucrose, glucose and fructose) was significantly reduced. As presented in Table 2 hereinabove, the sugars were converted to the fructooligosaccharide (FOS) and fructopolysaccharide (levan).

TABLE 3

Sugar reduction and sorbitol accumulation in apple juice incubated with immobilized *Zymomonas mobilis* dead cells

| | Sucrose mg/ml | Sorbitol mg/ml |
|---|---|---|
| Control | 40.4 | 4.9 |
| After 2 h of incubation | 30.9 | 16.6 |
| After 22 h of incubation | 7.4 | 18.1 |

Example 5: Effect of Culture Conditions of Living Microbial Cells on Juice Sugar Content Microbial cells first incubated with diluted apple juice were collected, washed and then re-suspended in apple juice to examine their ability to reduce the sugar content.

*K. lactis, O. polymorpha, M. fructicola, Z. mobilis G. xylinus, Pseudomonas* sp. #142, yeast isolated from olives, *B. licheniformis P. polymyxa, X. dendrorhous* or *M. laevaniformans* were grown for 48 hours in their specific growth medium, diluted 1:200 into 100 ml of apple juice adjusted to pH 7.0 by KOH (except *X. dendrorhous*, which was diluted into fresh apple juice) and grown for additional 48 hours. The cells were centrifuged and the pellet washed twice in distilled water (DW). The pellets were resuspended in 10 ml of apple juice to give a concentration of $1.8 \times 10^9$ or $1.8 \times 10^{10}$ CFU/ml for yeast and bacteria respectively.

The cells were then incubated with rotation as described hereinabove. Samples were taken at designated times and tested for $OD_{600}$, sugar content, and FOS content. BRIX value was also determined. Designated samples were analyzed for ethanol or acetic acid content.

Figure 4A:
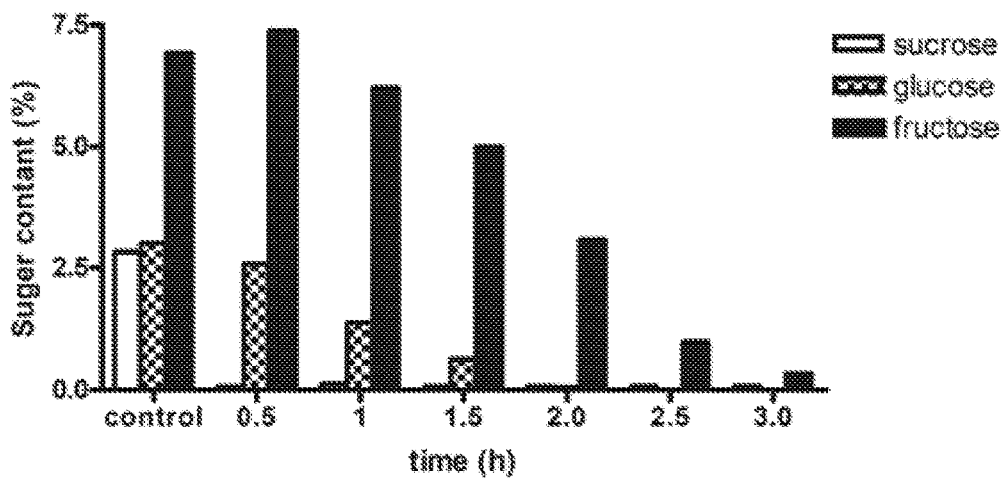
FIG. 4A: *Kluyveromyces lactis*.
Figure 4B:
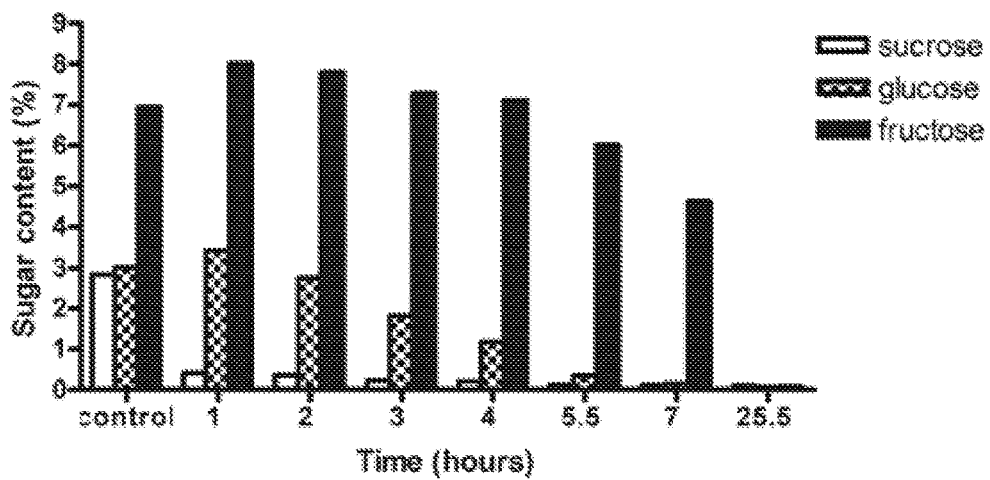
FIG. 4B: *Zymomonas mobilis*.
Figure 4C:
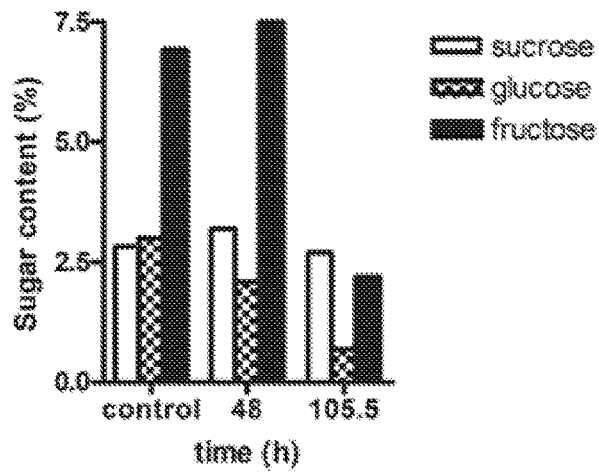
FIG. 4C: *Gluconobacter xylinus*.

All microorganisms tested (except *Pseudomonas* sp. #142) could reduce sugar content but at different rates. Representative data are presented in FIG. 4. *K. lactis* reduced sucrose content from 2.8% to 0.065% in only about 0.5 hour; glucose content from 3% to 0.005% in 2.5 hours and fructose content from 7% to 0.33% in 3 hours. *Z. mobilis* reduced all sugar to nearly zero after 25.5 hours. *G. xylinus* could only reduce glucose content and only after 105.5 hours of incubation. Analysis for acetic acid production revealed that *G. xylinus* produces acetic acid under these experimental conditions. It was therefore concluded that *G. xylinus* is not suitable for use in the process of the present invention.

Figure 5:
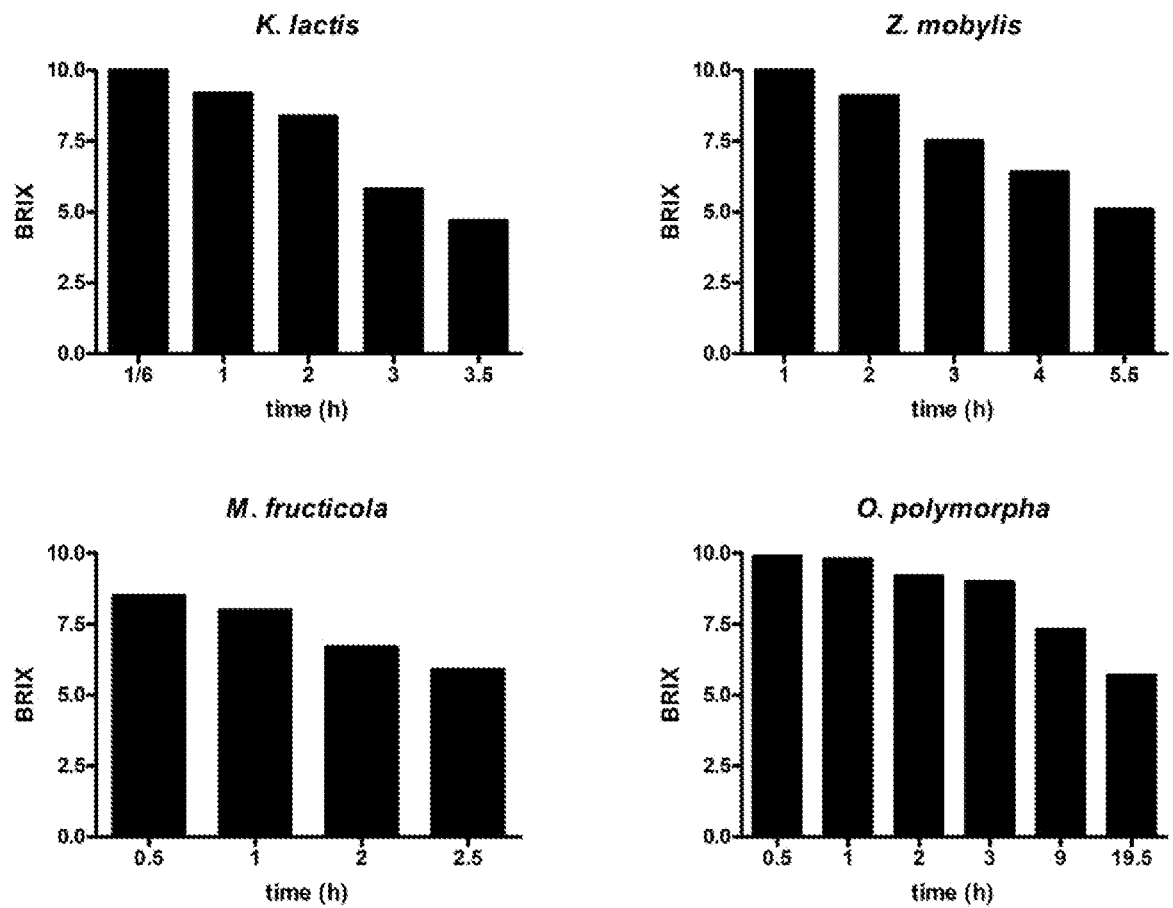
FIG. 5 shows the changes in BRIX of apple juice during incubation with different microorganisms.
Figure 5:
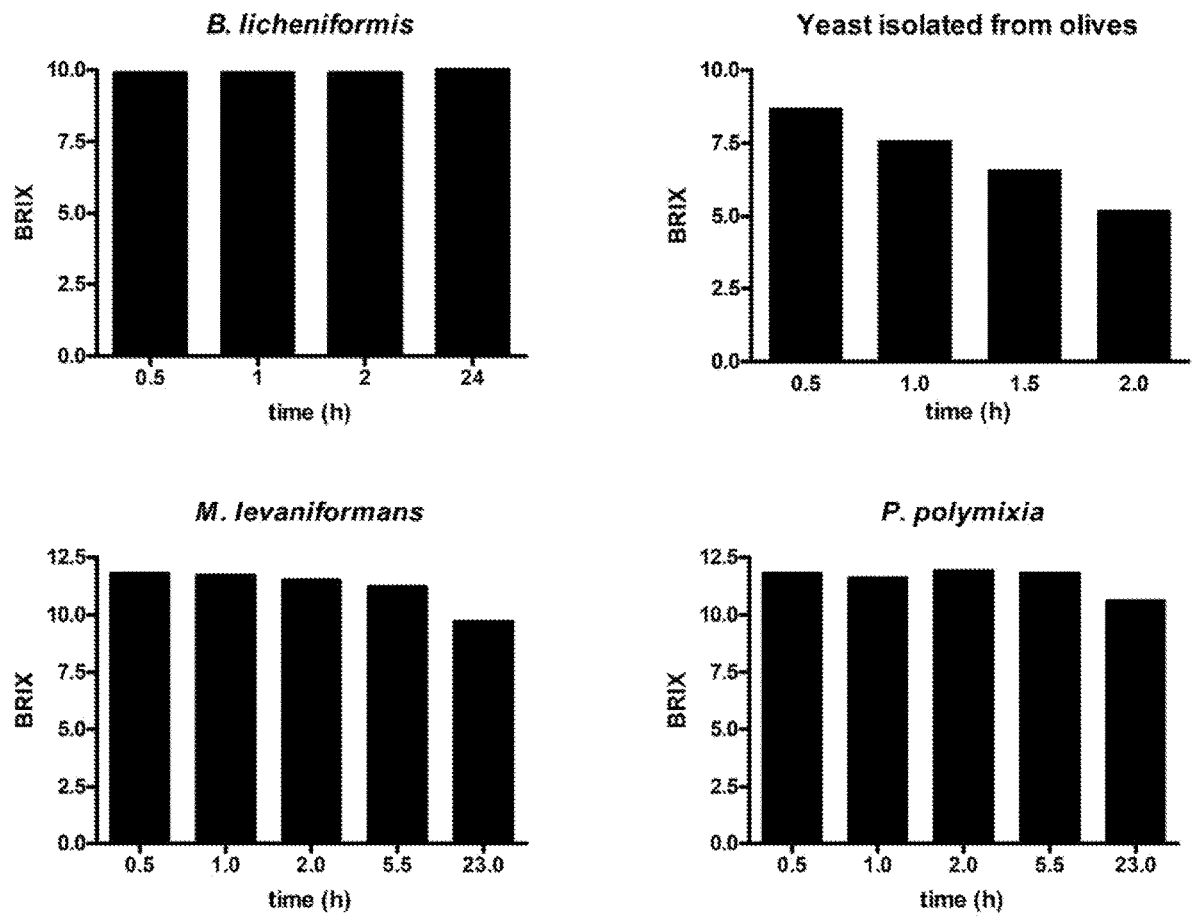

Example 6: Changes in BRIX of Apple Juice During Incubation with Different Live Microbial Cells As is shown in FIG. 5, the yeast isolated from olives reduced the BRIX of apple juice in the fastest manner, getting to BRIX of about 6 in about 2 hours of incubation. Reducing the apple juice BRIX to the same value (about 6) required 2.5 hours of incubation with *M. fructicola*, 3.5 hours with *K. lactis*, 5.5 hours with *Z. mobilis* and 19.5 hours of incubation with *O. polymorpha*. *M. levaniformans* and *P. polymyxa* were also found to have minor effect, reducing the BRIX to about 10 after 23 hours. *B. licheniformis* was found not to be effective in reducing the BRIX value which was maintained throughout the 24 hours of incubation.

Samples for ethanol analysis were taken at time points when the samples reached a BRIX of about 9 and about 6. Ethanol content analysis revealed that *K. lactis, Z. mobilis* and *M. fructicola* produced ethanol under the experimental conditions tested as described in tables 4-8. *O. polymorpha* produced the least amount of ethanol when the samples reached a BRIX of about 9; *M. fructicola* produced the least amount of ethanol when the samples reached a BRIX of about 6. *B. licheniformis* did not produce any ethanol. It is to be noted that when the baker yeast *S. cerevisiae* was tested under the same conditions, the amounts of ethanol were similar to those obtained with *Z. mobilis*.

TABLE 4

BRIX value and ethanol content in apple juice incubated with *K. lactis*

| BRIX | Ethanol (%) |
|---|---|
| 9.1 | 0.48 |
| 5.8 | 2.84 |

TABLE 5

Ethanol content in apple juice incubated with *Z. mobilis*

| Time (Hours) | Ethanol (%) |
|---|---|
| 9.1 | 1.46 |
| 6.4 | 3.13 |

TABLE 6

Ethanol content in apple juice incubated with *M. fructicola*

| Time (Hours) | Ethanol (%) |
|---|---|
| 8.5 | 0.16 |
| 5.9 | 1.71 |

TABLE 7

Ethanol content in apple juice incubated with *O. polymorpha*

| Time (Hours) | Ethanol (%) |
|---|---|
| 9.2 | 0.07 |
| 5.7 | 2.15 |

TABLE 8

Ethanol content in apple juice incubated with the yeast isolated from olives

| Time (Hours) | Ethanol (%) |
|---|---|
| 8.7 | 0.13 |
| 5.2 | 2.3 |

Figure 6:
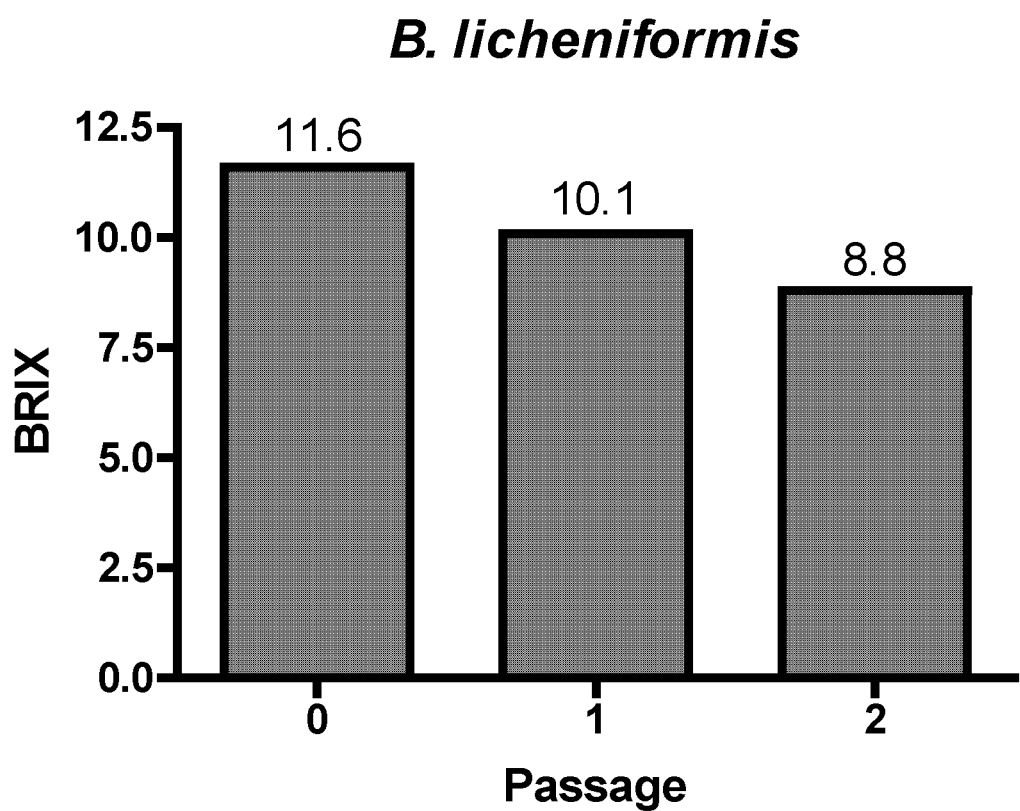
FIG. 6 shows the BRIX reduction by repeated contact with *Bacillus licheniformis*.

Since *B. licheniformis* did not produce any ethanol it was examined whether incubating apple juice with two different batches of bacteria will help reducing the BRIX levels. It was found that soaking about $10^{10}$ CFU/ml of *B. licheniformis* in apple juice during 30 minutes reduced the BRIX to 10.1 while soaking an additional batch of bacteria in the same juice reduced the BRIX to 8.8 (FIG. 6). Advantageously, no ethanol or acetic acid was produced.

Example 7: Production of Polysaccharides

FOS production by live *Z. mobilis* was examined as follows: bacteria were immersed in apple juice for 22 hours. The FOS were then precipitated from the treated juice or from a non-treated sample and hydrolyzed. Monosaccharide content was then analyzed and revealed a 1.6 fold increase in glucose content and 1.4 fold increase in fructose content in the juice treated with bacteria. This result indicates the formation of FOS by *Z. mobilis* in this experimental system.

FOS content was further evaluated during the incubation time using *Z. mobilis*, *P. polymyxa*, or *X. dendrorhous*. Samples were taken at the designated times and FOS was precipitated and weighed. The results are presented in Table 9 below.

TABLE 9

FOS content (mg/100 ml juice)

| Time (hours) | Z. mobilis | P. polymyxa | X. dendrorhous |
|---|---|---|---|
| 0 | 20 | 20 | 20 |
| 5.5 | 120 | 160 | 120 |
| 12 | 100 | 110 | 150 |
| 24 | 70 | 90 | |

As is apparent from Table 9, the highest FOS content was obtained at different incubation times for the different microorganisms. Incubation of 5.5 hours was found to be most effective for *Z. mobilis* and *P. polymyxa* while incubation time of 12 hours was the most effective for *X. dendrorhous*. *M. laevaniformans* formed negligible amounts of FOS under the experimental conditions.

The possibility that higher FOS levels can be obtained by re-incubating apple juice treated once with FOS forming microorganisms for 5.5 hours with a second batch of the microorganisms for 5 hours was examined. After the second incubation time, the FOS content in the apple juice incubated with *P. polymyxa* was 70 mg/100 ml of juice; 110 mg/100 ml in apple juice incubated with *Z. mobilis* and 190 mg/100 ml in apple juice incubated with *X. dendrorhous*. Thus, only for *X. dendrorhous* a second incubation time was significant for further production of FOS.

Example 8: Examination of the Effect of Various Growth Conditions on the BRIX Reduction Activity of Live *A. japonicus*

Figure 7A:
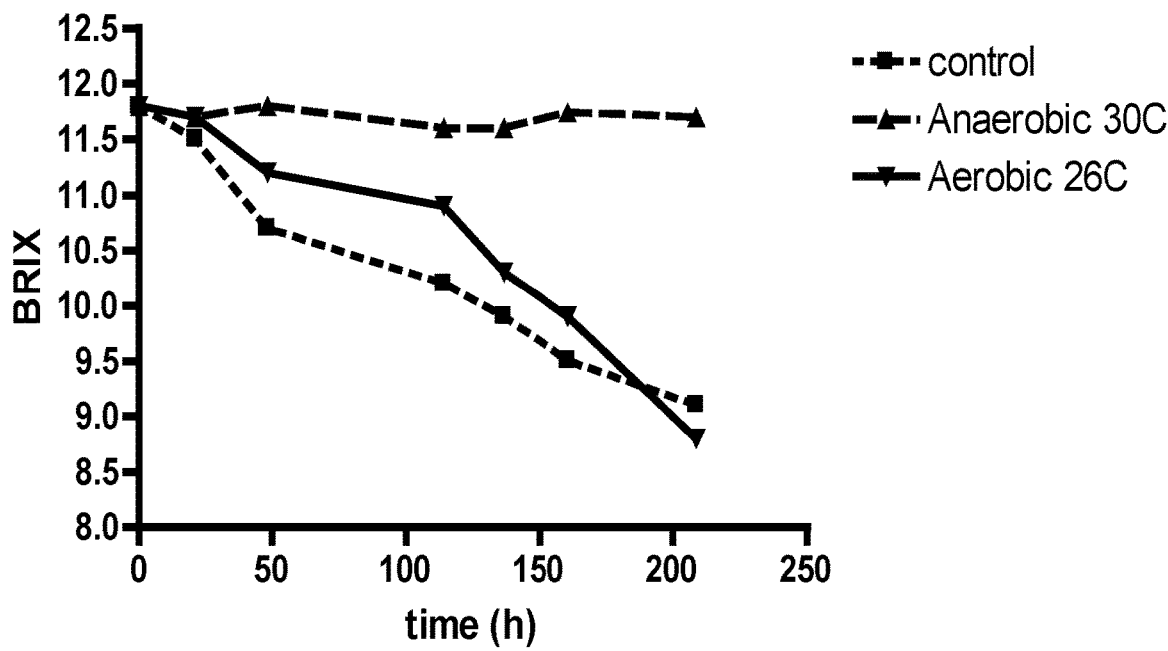
FIG. 7A: effect of aeration and growth temperature.
Figure 7B:
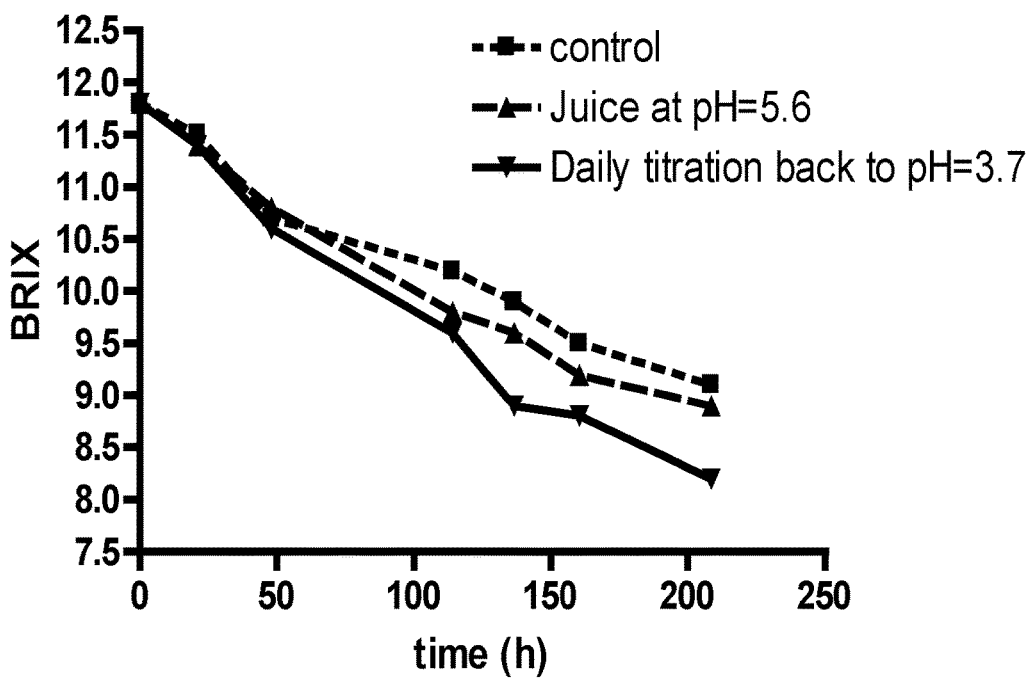
FIG. 7B: Effect of juice pH
Figure 7C:
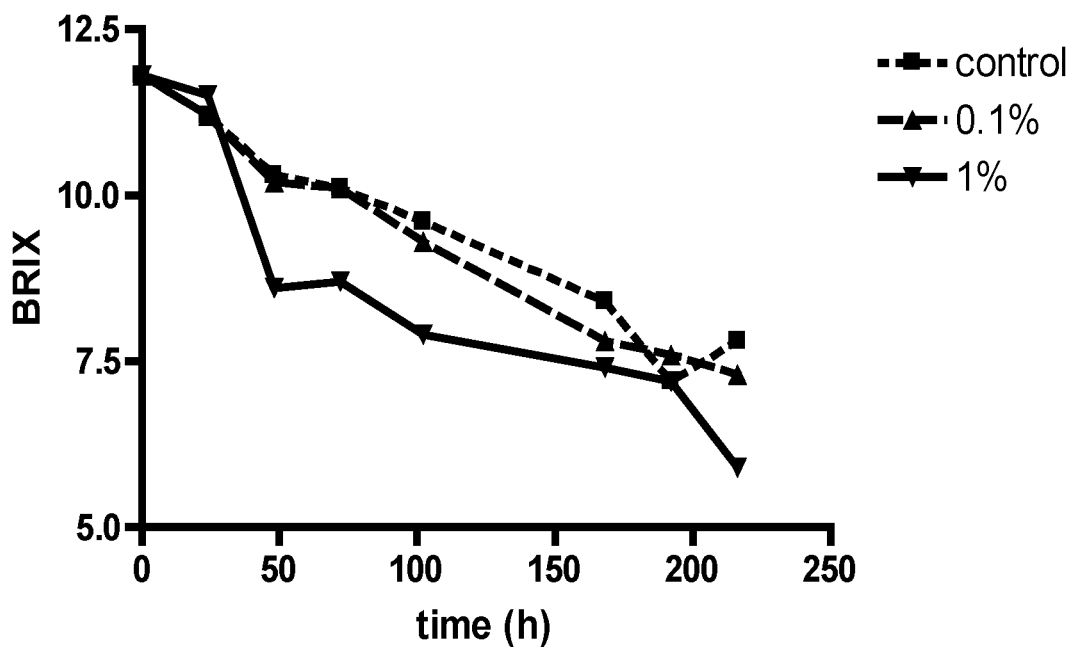
FIG. 7C: effect of addition of yeast extract.
Figure 7D:
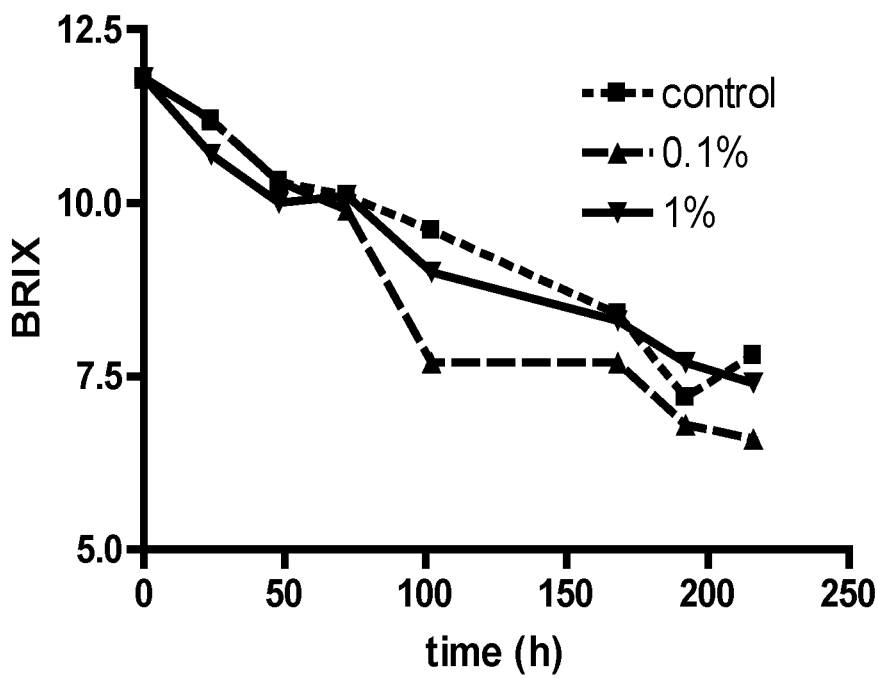
FIG. 7D: Effect of addition of ammonium nitrate.

The growth experiment using *A. japonicus* was repeated using different growth conditions in order to examine their effect on BRIX reduction and FOS yield. The control conditions were as described hereinabove (Aerobic, 30° C.) but with greater aeration. The following conditions were examined: aeration and growth temperature (FIG. 7A); juice pH of 5.6 or juice pH titrated daily to pH=7 (FIG. 7B); addition of 0.1% or 1% yeast extract (FIG. 7C); addition of 0.1% or 1% ammonium nitrate (FIG. 7D); addition of 1% peptone or 1% sucrose (FIG. 7E). BRIX was checked at the indicated times.

As is apparent from FIG. 7, growing the fungus in apple juice containing 1% Yeast extract, at 30° C. and under aerobic conditions resulted in the most significant decrease in the BRIX value. Under all designated growth conditions FOS production by *A. Japonicus* was negligible.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A process for preparing a low sugar, high fiber food product comprising the step of contacting a starting food product containing sugar or a composition comprising same with at least one type of dead microbial cells, wherein the dead microbial cells are active in reducing the sugar content of the starting food product and in converting said sugar mono- or disaccharides to at least one oligosaccharide and/or polysaccharide, thereby obtaining a processed food product with reduced sugar content and elevated content of at least one oligosaccharide and/or polysaccharide compared to the starting food product.

2. The process of claim 1, wherein the dead microbial cells are immobilized in or on a matrix.

3. The process of claim 1, wherein the microbial cells are selected from the group consisting of yeast cells, bacterial cells, fungi cells and any combination thereof.

4. The process of claim 3, wherein the microbial cells are of yeast selected from the group consisting of *Xanthophyllomyces dendrorhous*, *Kluyveromyces lactis*, *Ogataea polymorpha*, *Metschnikowia fructicola*, *Saccharomyces cerevisiae*, yeast isolated from olives and any combination thereof.

5. The process of claim 3, wherein the bacterial cells are selected from the group consisting of *Zymomonas mobilis, Bacillus licheniformis, Paenibacillus polymyxa, Acetobacter xylinum, Sarcina ventriculi, Gluconobacter xylinus, Pseudomonas* sp. #142, *Microbacterium laevaniformans, Bacillus subtilis, Bacillus macerans, Streptococcus Salivarius, Leuconostoc mesenteroides, Aerobacter levanicum*, and any combination thereof.

6. The process of claim 3, wherein the species of the fungal cells is selected from the group consisting of *Aspergillus japonicus, Aspergillus niger, Aspergillus foetidus, Aspergillus oryza Aureobasidium pullulans, Sclerotinia sclerotiorum* and *Scopulariopsis brevicaulis*.

7. The process of claim 1, wherein the starting food product is selected from the group consisting of natural juice and a ready-to-drink product containing sugar.

8. The process of claim 2, wherein the immobilized dead microbial cells are packed in a bed or a column.

9. The process of claim 1, wherein the processed food product contains reduced amount of a sugar selected from the group consisting of glucose, fructose, sucrose and any combination thereof compared to the sugar content in the starting food product.

10. The process of claim 1, wherein the processed food product contains elevated amount of at least one oligosaccharide, at least one polysaccharide, at least one sugar alcohol, gluconic acid and any combination thereof compared to the amount in the starting food product.

11. The process of claim 1, said process is consisting of the step of contacting a starting food product containing sugar or a composition comprising same with at least one type of dead microbial cells.

12. The process of claim 1, said microbial cells consist of dead cells.

* * * * *